US009565747B2

(12) United States Patent
Morrisroe

(10) Patent No.: US 9,565,747 B2
(45) Date of Patent: Feb. 7, 2017

(54) ASYMMETRIC INDUCTION DEVICES AND SYSTEMS AND METHODS USING THEM

(71) Applicant: Peter J Morrisroe, New Milford, CT (US)

(72) Inventor: Peter J Morrisroe, New Milford, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 317 days.

(21) Appl. No.: 14/208,699

(22) Filed: Mar. 13, 2014

(65) Prior Publication Data

US 2014/0263203 A1 Sep. 18, 2014

Related U.S. Application Data

(60) Provisional application No. 61/782,030, filed on Mar. 14, 2013, provisional application No. 61/788,144, filed on Mar. 15, 2013.

(51) Int. Cl.
*B23K 10/00* (2006.01)
*H05H 1/30* (2006.01)

(52) U.S. Cl.
CPC .............................. *H05H 1/30* (2013.01)

(58) Field of Classification Search
CPC .............. H05H 1/30; H05H 1/34; H01J 49/00; H01J 37/321; H01J 37/022
USPC ...... 219/121.36, 121.52, 121.48; 315/111.51
See application file for complete search history.

(56) References Cited

U.S. PATENT DOCUMENTS

| | | | | |
|---|---|---|---|---|
| 3,823,296 A | | 7/1974 | Amagami | |
| 5,383,019 A | | 1/1995 | Farrell | |
| 5,519,215 A | | 5/1996 | Anderson | |
| 6,414,648 B1 | * | 7/2002 | Holland | H01J 37/321 118/723 I |
| 9,070,542 B2 | * | 6/2015 | Ivashin | H01J 49/105 |
| 9,253,867 B2 | * | 2/2016 | Yamazawa | H01J 37/321 |
| 2002/0041160 A1 | * | 4/2002 | Barnes | H01J 37/321 315/111.21 |
| 2011/0253310 A1 | * | 10/2011 | Benjamin | H01J 37/321 156/345.1 |
| 2012/0325783 A1 | | 12/2012 | Morrisroe | |
| 2015/0108898 A1 | * | 4/2015 | Cheung | H05H 1/30 315/111.51 |

OTHER PUBLICATIONS

ISR/IPRP from PCT/US25793 mailed on Sep. 4, 2014.

* cited by examiner

*Primary Examiner* — Mark Paschall
(74) *Attorney, Agent, or Firm* — Rhodes IP PLC; Christopher R Rhodes

(57) ABSTRACT

Certain embodiments described herein are directed to devices, systems and methods that comprise asymmetric induction devices. In some instances, the device can include a plurality of plate electrodes which can be spaced asymmetrically or a plurality of coils which can be spaced asymmetrically.

20 Claims, 18 Drawing Sheets

| Parameter | Value |
|---|---|
| RFG Power / W | 1600 |
| RFG Filament Current / A | 20.62 |
| RFG Filament Voltage / V | 6.251 |
| RFG Grid Current / mA | 74 |
| RFG Plate Current / mA | 564 |
| RFG Plate Voltage / V | 4236 |
| Oscillating Frequency / MHz | 43.9 |
| RFG Temperature / C | 55 |
| Torch Box Temperature/ C | 46 |
| Interface Temperature / C | 49 |
| Torch Box Exhaust / CFM | 140 |
| RFG Exhaust / CFM | 140 |

FIG. 15

Intensity / cps
CeO/Ce %
Neb Gas / L.min⁻¹

| | 4 mm - 4mm | 4 mm – 6 mm | 4 mm – 2 mm | 2 mm - 4 mm |
|---|---|---|---|---|
| Be | 5645 | 4445 | 11030 | 9346 |
| Mg | 28730 | 17462 | 53789 | 51711 |
| In | 50386 | 30370 | 84909 | 86101 |
| U | 34696 | 18894 | 64979 | 61362 |
| CeO/Ce % | 2.5 | 2.5 | 2.4 | 2.4 |
| Ce++/Ce % | 1 | 1 | 0.7 | 0.8 |
| BKGD 8 | 3 | 3 | 11 | 9 |
| BKGD 220 | 0.7 | 0.3 | 0.7 | 0.3 |
| Neb Gas Flow | 0.92 | 0.98 | 0.86 | 0.89 |
| Z position / mm | 0 | +3 | -2 | -2 |
| Sampling Depth | 11 | 12 | 11 | 11 |

FIG. 18

ASYMMETRIC INDUCTION DEVICES AND SYSTEMS AND METHODS USING THEM

PRIORITY APPLICATIONS

This application is related to, and claims the benefit of, each of U.S. Patent Application No. 61/782,030 filed on Mar. 14, 2013 and U.S. Patent Application No. 61/788,144 filed on Mar. 15, 2013, the entire disclosure of each of which is hereby incorporated herein by reference for all purposes.

TECHNOLOGICAL FIELD

This application is related to asymmetric induction devices and systems and methods using them. More particularly, certain embodiments described herein are directed to induction devices with unequal spacing between coils or plates.

BACKGROUND

Many inductively coupled plasma optical emission spectroscopy (ICP-OES) systems, inductively coupled plasma atomic absorption spectroscopy (ICP-AAS) systems, and inductively coupled plasma mass spectroscopy (ICP-MS) systems use a solenoid receptive of an RF electrical current for forming a plasma.

SUMMARY

Certain features, aspects and embodiments described herein are directed to devices, systems and methods that are configured to sustain a plasma within a torch. In some examples, the devices include an asymmetric spacing of coils or plate electrodes to sustain a plasma with an unequal temperature distribution. As described in more detail herein, the devices can permit more precise analysis (or selection) of certain species and may reduce formation of oxides that can interfere with analysis or selection of desired ions or atoms.

In one aspect, a system comprising a torch body, and an induction device comprising a plurality of asymmetrically spaced induction coils configured to receive a portion of the torch body to sustain an atomization source in the torch body is provided.

In certain embodiments, the system can include a detector fluidically coupled to the torch body and configured to receive analyte species from the atomization source sustained in the torch body. In other embodiments, the detector is selected from the group consisting of an optical excitation detector, an absorption detector and a mass spectrometer. In some examples, the induction device comprises a first coil, a second coil and a third coil, in which spacing between the first coil and the second coil is greater than spacing between the second coil and the third coil, and in which the third coil is configured to be positioned closest to a terminus of the torch body. In other examples, the induction device comprises a first coil, a second coil and a third coil, in which spacing between the first coil and the second coil is less than spacing between the second coil and the third coil, and in which the third coil is configured to be positioned closest to a terminus of the torch body. In additional examples, the system can include a radio frequency source electrically coupled to the induction device. In further embodiments, the radio frequency source is configured to provide radio frequencies of about 1 MHz to about 1000 MHz at a power of about 10 Watts to about 10,000 Watts. In some examples, the system can include a first radio frequency source electrically coupled to at least one coil of the induction device and a second radio frequency source electrically coupled to a different coil of the induction device. In additional examples, each of the first radio frequency source and the second radio frequency source is configured to provide radio frequencies of about 1 MHz to about 1,000 MHz at a power of about 10 Watts to about 10,000 Watts.

In some embodiments, the induction device comprises a first coil, a second coil and a third coil, in which spacing between the first coil and the second coil is greater than spacing between the second coil and the third coil, and in which the third coil is configured to be positioned closest to a terminus of the torch body, and in which the spacing between each coil is selected to shift a maximum analyte signal to occur at a lower nebulization gas flow rate. In additional embodiments, the spacing between the first coil and the second coil is about 4 mm and the spacing between the second coil and the third coil is about 2 mm.

In additional embodiments, the induction device comprises a first coil, a second coil and a third coil, in which spacing between the first coil and the second coil is less than spacing between the second coil and the third coil, and in which the third coil is configured to be positioned closest to a terminus of the torch body, and in which the spacing between each coil is selected to shift a maximum analyte signal to occur at a lower nebulization gas flow rate. In some embodiments, the spacing between the first coil and the second coil is about 2 mm and the spacing between the second coil and the third coil is about 4 mm.

In certain examples, the induction device comprises at least four coils with at least two of the coils spaced differently than a spacing between two other coils. In additional examples, the induction device comprises at least five coils with at least two of the coils spaced differently than a spacing between two other coils. In further examples, the system comprises a radio frequency source electrically coupled to the induction device, the radio frequency source comprising variable capacitors configured to permit adjustment of a plasma voltage with different coil spacing. In some embodiments, the system comprises a sampling interface fluidically coupled to the torch body. In certain examples, the sampling interface comprises a sampling cone. In some examples, the induction device comprises a first coil, a second coil and a third coil, in which spacing between the first coil and the second coil is less than spacing between the second coil and the third coil, and in which the third coil is configured to be positioned closest to a terminus of the torch body, and in which the spacing between each coil is selected to shift a maximum interfering oxide signal to occur at a higher nebulization gas flow rate. In additional examples, the induction device comprises a first coil, a second coil and a third coil, in which spacing between the first coil and the second coil is less than spacing between the second coil and the third coil, and in which the third coil is configured to be positioned closest to a terminus of the torch body, and in which the spacing between each coil is selected to shift a maximum interfering oxide signal to occur at a higher nebulization gas flow rate.

In another aspect, a system comprising a torch body and an induction device comprising a plurality of asymmetrically spaced plate electrodes configured to receive a portion of the torch body to sustain an atomization source in the torch body is described.

In certain embodiments, the system can include a detector fluidically coupled to the torch body and configured to receive analyte species from the atomization source sustained in the torch body. In other embodiments, the detector is selected from the group consisting of an optical excitation detector, an absorption detector and a mass spectrometer. In some embodiments, the induction device comprises a first plate electrode, a second plate electrode and a third plate electrode, in which spacing between the first plate and the second plate is greater than spacing between the second plate and the third plate, and in which the third plate is configured to be positioned closest to a terminus of the torch body. In other embodiments, the induction device comprises a first plate electrode, a second plate electrode and a third plate electrode, in which spacing between the first plate and the second plate is less than spacing between the second plate and the third plate, and in which the third plate is configured to be positioned closest to a terminus of the torch body. In certain examples, the system can include a radio frequency source electrically coupled to the induction device. In some examples, the radio frequency source is configured to provide radio frequencies of about 1 MHz to about 1000 MHz at a power of about 10 Watts to about 10,000 Watts. In other examples, the system can include a first radio frequency source electrically coupled to at least one plate of the induction device and a second radio frequency source electrically coupled to a different plate of the induction device. In some embodiments, each of the first radio frequency source and the second radio frequency source is configured to provide radio frequencies of about 1 MHz to about 1,000 MHz at a power of about 10 Watts to about 10,000 Watts.

In certain examples, the induction device comprises a first plate, a second plate and a third plate, in which spacing between the first plate and the second plate is greater than spacing between the second plate and the third plate, and in which the third plate is configured to be positioned closest to a terminus of the torch body, and in which the spacing between each plate is selected to shift a maximum analyte signal to occur at a lower nebulization gas flow rate. In some examples, the spacing between the first plate and the second plate is about 4 mm and the spacing between the second plate and the third plate is about 2 mm.

In certain embodiments, the induction device comprises a first plate, a second plate and a third plate, in which spacing between the first plate and the second plate is less than spacing between the second plate and the third plate, and in which the third plate is configured to be positioned closest to a terminus of the torch body, and in which the spacing between each plate is selected to shift a maximum analyte signal to occur at a lower nebulization gas flow rate. In some examples, the spacing between the first plate and the second plate is about 2 mm and the spacing between the second plate and the third plate is about 4 mm.

In certain examples, the induction device comprises at least four plate electrodes with at least two of the plate electrodes spaced differently than a spacing between two other plate electrodes. In certain embodiments, the induction device comprises at least five plate electrodes with at least two of the plate electrodes spaced differently than a spacing between two other plate electrodes. In certain examples, the system can include a radio frequency source electrically coupled to the induction device, the radio frequency source comprising variable capacitors configured to permit adjustment of a plasma voltage with different plate spacing. In other examples, the system can include a sampling interface fluidically coupled to the torch body, e.g., a mass spectrometry sampling interface. In other examples, the sampling interface comprises a sampling cone. In certain embodiments, the induction device comprises a first plate, a second plate and a third plate, in which spacing between the first plate and the second plate is less than spacing between the second plate and the third plate, and in which the third plate is configured to be positioned closest to a terminus of the torch body, and in which the spacing between each plate is selected to shift a maximum interfering oxide signal to occur at a higher nebulization gas flow rate. In further embodiments, the induction device comprises a first plate, a second plate and a third plate, in which spacing between the first plate and the second plate is less than spacing between the second plate and the third plate, and in which the third plate is configured to be positioned closest to a terminus of the torch body, and in which the spacing between each plate is selected to shift a maximum interfering oxide signal to occur at a higher nebulization gas flow rate.

In another aspect, a device for generating a plasma in a torch body with a longitudinal axis along which a flow of gas is introduced during operation of the torch body and with a radial plane substantially perpendicular to the longitudinal axis of the torch body, the device comprising a plurality of induction coils coupled to each other and configured to receive a portion of the torch body, in which at least two of the plurality of induction coils are asymmetrically spaced in a direction substantially parallel to the longitudinal axis of the torch body is provided.

In certain examples, the device can include a detector fluidically coupled to the torch body and configured to receive analyte species from the atomization source sustained in the torch body. In other embodiments, the detector is selected from the group consisting of an optical excitation detector, an absorption detector and a mass spectrometer. In some examples, the device can include a first coil, a second coil and a third coil, in which spacing between the first coil and the second coil is greater than spacing between the second coil and the third coil, and in which the third coil is configured to be positioned closest to a terminus of the torch body. In some examples, the device comprises a first coil, a second coil and a third coil, in which spacing between the first coil and the second coil is less than spacing between the second coil and the third coil, and in which the third coil is configured to be positioned closest to a terminus of the torch body. In further examples, the device comprises a radio frequency source electrically coupled to the device. In additional examples, the radio frequency source is configured to provide radio frequencies of about 1 MHz to about 1000 MHz at a power of about 10 Watts to about 10,000 Watts. In some embodiments, the device can include a first radio frequency source electrically coupled to at least one coil of the device and a second radio frequency source electrically coupled to a different coil of the device. In further examples, each of the first radio frequency source and the second radio frequency source is configured to provide radio frequencies of about 1 MHz to about 1,000 MHz at a power of about 10 Watts to about 10,000 Watts.

In certain embodiments, the device comprises a first coil, a second coil and a third coil, in which spacing between the first coil and the second coil is greater than spacing between the second coil and the third coil, and in which the third coil is configured to be positioned closest to a terminus of the torch body, and in which the spacing between each coil is selected to shift a maximum analyte signal to occur at a lower nebulization gas flow rate. In some examples, the spacing between the first coil and the second coil is about 4 mm and the spacing between the second coil and the third coil is about 2 mm.

In other embodiments, the device comprises a first coil, a second coil and a third coil, in which spacing between the first coil and the second coil is less than spacing between the second coil and the third coil, and in which the third coil is configured to be positioned closest to a terminus of the torch body, and in which the spacing between each coil is selected to shift a maximum analyte signal to occur at a lower nebulization gas flow rate. In some examples, the spacing between the first coil and the second coil is about 2 mm and the spacing between the second coil and the third coil is about 4 mm.

In additional examples, the device comprises at least four coils with at least two of the coils spaced differently than a spacing between two other coils. In further examples, the device comprises at least five coils with at least two of the coils spaced differently than a spacing between two other coils. In other examples, the device can include a radio frequency source electrically coupled to the device, the radio frequency source comprising variable capacitors configured to permit adjustment of a plasma voltage with different coil spacing. In further embodiments, the device can include a sampling interface fluidically coupled to the torch body. In some embodiments, the sampling interface comprises a sampling cone. In certain embodiments, the device comprises a first coil, a second coil and a third coil, in which spacing between the first coil and the second coil is less than spacing between the second coil and the third coil, and in which the third coil is configured to be positioned closest to a terminus of the torch body, and in which the spacing between each coil is selected to shift a maximum interfering oxide signal to occur at a higher nebulization gas flow rate. In other embodiments, the device comprises a first coil, a second coil and a third coil, in which spacing between the first coil and the second coil is less than spacing between the second coil and the third coil, and in which the third coil is configured to be positioned closest to a terminus of the torch body, and in which the spacing between each coil is selected to shift a maximum interfering oxide signal to occur at a higher nebulization gas flow rate.

In an additional aspect, a device for generating a plasma in a torch body with a longitudinal axis along which a flow of gas is introduced during operation of the torch body and with a radial plane substantially perpendicular to the longitudinal axis of the torch body, the device comprising a plurality of flat plate electrodes configured to receive a portion of the torch body, in which at least two of the plurality of flat plate electrodes are asymmetrically spaced in a direction substantially parallel to the longitudinal axis of the torch body is provided.

In certain embodiments, the device can include a detector fluidically coupled to the torch body and configured to receive analyte species from the atomization source sustained in the torch body. In other embodiments, the detector is selected from the group consisting of an optical excitation detector, an absorption detector and a mass spectrometer. In some examples, the device comprises a first plate electrode, a second plate electrode and a third plate electrode, in which spacing between the first plate and the second plate is greater than spacing between the second plate and the third plate, and in which the third plate is configured to be positioned closest to a terminus of the torch body. In certain examples, the device comprises a first plate electrode, a second plate electrode and a third plate electrode, in which spacing between the first plate and the second plate is less than spacing between the second plate and the third plate, and in which the third plate is configured to be positioned closest to a terminus of the torch body. In certain embodiments, the device can include a radio frequency source electrically coupled to the device. In some examples, the radio frequency source is configured to provide radio frequencies of about 1 MHz to about 1000 MHz at a power of about 10 Watts to about 10,000 Watts. In other examples, the device can include a first radio frequency source electrically coupled to at least one plate of the device and a second radio frequency source electrically coupled to a different plate of the device. In some examples, each of the first radio frequency source and the second radio frequency source is configured to provide radio frequencies of about 1 MHz to about 1,000 MHz at a power of about 10 Watts to about 10,000 Watts.

In certain examples, the device can include a first plate, a second plate and a third plate, in which spacing between the first plate and the second plate is greater than spacing between the second plate and the third plate, and in which the third plate is configured to be positioned closest to a terminus of the torch body, and in which the spacing between each plate is selected to shift a maximum analyte signal to occur at a lower nebulization gas flow rate. In some examples, the spacing between the first plate and the second plate is about 4 mm and the spacing between the second plate and the third plate is about 2 mm.

In other examples, the device can include a first plate, a second plate and a third plate, in which spacing between the first plate and the second plate is less than spacing between the second plate and the third plate, and in which the third plate is configured to be positioned closest to a terminus of the torch body, and in which the spacing between each plate is selected to shift a maximum analyte signal to occur at a lower nebulization gas flow rate. In some embodiments, the spacing between the first plate and the second plate is about 2 mm and the spacing between the second plate and the third plate is about 4 mm.

In certain examples, the device comprises at least four plate electrodes with at least two of the plate electrodes spaced differently than a spacing between two other plate electrodes. In other examples, the device comprises at least five plate electrodes with at least two of the plate electrodes spaced differently than a spacing between two other plate electrodes. In some embodiments, the device comprises a radio frequency source electrically coupled to the device, the radio frequency source comprising variable capacitors configured to permit adjustment of a plasma voltage with different plate spacing. In further examples, the device comprises a sampling interface fluidically coupled to the torch body. In additional examples, the sampling interface comprises a sampling cone. In some embodiments, the device comprises a first plate, a second plate and a third plate, in which spacing between the first plate and the second plate is less than spacing between the second plate and the third plate, and in which the third plate is configured to be positioned closest to a terminus of the torch body, and in which the spacing between each plate is selected to shift a maximum interfering oxide signal to occur at a higher nebulization gas flow rate. In additional embodiments, the device comprises a first plate, a second plate and a third plate, in which spacing between the first plate and the second plate is less than spacing between the second plate and the third plate, and in which the third plate is configured to be positioned closest to a terminus of the torch body, and in which the spacing between each plate is selected to shift a maximum interfering oxide signal to occur at a higher nebulization gas flow rate.

In an additional aspect, a method comprising providing a loop current to a torch body from an induction device comprising a plurality of induction coils configured to sustain a plasma in the torch body, in which each induction coil of the plurality of induction coils provides a loop current and in which at least two of the provided loop currents are asymmetrically spaced from each other along a direction that is substantially parallel to the longitudinal axis of the torch body is described.

In certain embodiments, the method can include configuring the induction device to comprise a first comprises a first coil, a second coil and a third coil, in which spacing between the first coil and the second coil is greater than spacing between the second coil and the third coil, and in which the third coil is configured to be positioned closest to a terminus of the torch body. In additional embodiments, the method can include configuring the induction device to comprise a first coil, a second coil and a third coil, in which spacing between the first coil and the second coil is less than spacing between the second coil and the third coil, and in which the third coil is configured to be positioned closest to a terminus of the torch body. In further embodiments, the method can include providing loop currents which are spaced closest to each other at a terminus of the torch body. In some examples, the method can include configuring each of the provided, loop currents as a planar current that is substantially perpendicular to a longitudinal axis of the torch body. In certain embodiments, a first loop current flows in an opposite direction that a second loop current. In some examples, the method can include configuring the induction device to be electrically coupled to a grounding plate. In some embodiments, the method can include configuring the induction device to comprise a plurality of coils with the inner diameter of a first coil being different than the inner diameter of a second coil. In some examples, the inner diameter of coils that are spaced closest together is about the same. In additional examples, the method can include configuring the induction device to comprise at least four coils.

In another aspect, a method comprising providing a loop current to a torch body from an induction device comprising a plurality of plate electrodes configured to sustain a plasma in the torch body, in which each plate electrode of the plurality of plate electrodes provides a loop current and in which at least two of the provided loop currents are asymmetrically spaced from each other along a direction that is substantially parallel to the longitudinal axis of the torch body is disclosed.

In certain embodiments, the method can include configuring the induction device to comprise a first comprises a first plate electrode, a second plate electrode and a third plate electrode, in which spacing between the first plate and the second plate is greater than spacing between the second plate and the third plate, and in which the third plate is configured to be positioned closest to a terminus of the torch body. In other embodiments, the method can include configuring the induction device to comprise a first plate electrode, a second plate electrode and a third plate electrode, in which spacing between the first plate and the second plate is less than spacing between the second plate and the third plate, and in which the third plate is configured to be positioned closest to a terminus of the torch body. In further embodiments, the method can include providing loop currents which are spaced closest to each other at a terminus of the torch body. In additional embodiments, the method can include configuring each of the provided, loop currents as a planar current that is substantially perpendicular to a longitudinal axis of the torch body. In some examples, a first loop current flows in an opposite direction that a second loop current. In other examples, the method can include configuring the induction device to be electrically coupled to a grounding plate. In some examples, the method can include configuring the induction device to comprise a plurality of plate electrodes with the inner diameter of a first plate being different than the inner diameter of a second plate. In additional examples, the inner diameter of plates that are spaced closest together is about the same. In other examples, the method can include configuring the induction device to comprise at least four plate electrodes.

In another aspect, a method comprising providing an effective, asymmetric loop current to a torch body configured to sustain an atomization source to increase peak-to-peak separation of an analyte signal and an interfering oxide signal is described.

In certain embodiments, the asymmetric loop current is effective to shift the peak of the analyte signal to a lower sample flow rate than a sample flow rate used at the interfering oxide signal. In other embodiments, the asymmetric loop current is provided using asymmetrically spaced induction coils. In additional embodiments, coil spacing between coils closer to a terminus of the torch body is smaller than coil spacing between coils farther from the terminus of the torch body. In other examples, the method can include altering the provided plasma voltage with different coil spacing. In further examples, the asymmetric loop current is provided using asymmetrically spaced plate electrodes. In additional examples, plate spacing between plates closer to a terminus of the torch body is smaller than plate spacing between plates farther from the terminus of the torch body. In some examples, the method can include altering the provided plasma voltage with different plate spacing. In further examples, the method can include configuring spacing between two coils of the induction device to be about 4 mm and configuring spacing between two other coils of the induction device to be about 2 mm. In some embodiments, the method can include configuring spacing between two plate electrodes of the induction device to be about 4 mm and configuring spacing between two other plate electrodes of the induction device to be about 2 mm.

In an additional aspect, a method comprising providing an asymmetric loop current to a torch body configured to sustain an inductively coupled plasma to lower a ratio of CeO/Ce compared to a ratio of CeO/Ce which results when a symmetric loop current is provided to the torch body is disclosed.

In certain embodiments, the CeO/Ce ratio is 2.5% or less at a nebulization gas flow rate used to analyze an analyte. In some examples, the method can include configuring the torch body with an asymmetric induction coil to provide the asymmetric loop current. In further examples, coil spacing between coils closer to a terminus of the torch body is smaller than coil spacing between coils farther from the terminus of the torch body. In other examples, the method can include altering the provided plasma voltage with different coil spacing. In additional examples, the method can include configuring the torch body with asymmetric plate electrodes to provide the asymmetric loop current. In further examples, plate spacing between plates closer to a terminus of the torch body is smaller than plate spacing between plates farther from the terminus of the torch body. In other examples, the method can include altering the provided plasma voltage with different plate spacing. In additional examples, the method can include configuring spacing between two coils of the induction device to be about 4 mm and configuring spacing between two other coils of the induction device to be about 2 mm. In some examples, the method can include configuring spacing between two plate electrodes of the induction device to be about 4 mm and configuring spacing between two other plate electrodes of the induction device to be about 2 mm.

In another aspect, a method comprising providing an effective, asymmetric loop current to a torch body configured to sustain an inductively coupled plasma, in which the asymmetric loop current is effective to shift a maximum analyte signal, for a constant concentration of analyte, to a lower nebulization gas flow rate using the asymmetric loop current compared to a nebulization gas flow rate used to provide a maximum analyte signal using a symmetric loop current is described.

In certain embodiments, the asymmetric loop current is effective to shift the peak of the analyte signal to a lower sample flow rate than a sample flow rate used at the interfering oxide signal. In some examples, the asymmetric loop current is provided using asymmetrically spaced induction coils. In additional examples, coil spacing between coils closer to a terminus of the torch body is smaller than coil spacing between coils farther from the terminus of the torch body. In further examples, the method can include altering the provided plasma voltage with different coil spacing. In some embodiments, the asymmetric loop current is provided using asymmetrically spaced plate electrodes. In other embodiments, plate spacing between plates closer to a terminus of the torch body is smaller than plate spacing between plates farther from the terminus of the torch body. In some examples, the method can include altering the provided plasma voltage with different plate spacing. In additional examples, the method can include configuring spacing between two coils of the induction device to be about 4 mm and configuring spacing between two other coils of the induction device to be about 2 mm. In certain examples, the method can include configuring spacing between two plate electrodes of the induction device to be about 4 mm and configuring spacing between two other plate electrodes of the induction device to be about 2 mm.

In another aspect, an asymmetric plasma produced by providing an asymmetric loop current from an asymmetric induction device comprising a plurality of induction coils coupled to each other and configured to receive a portion of a torch body that sustains the asymmetric plasma, in which at least two of the plurality of induction coils are asymmetrically spaced in a direction substantially parallel to the longitudinal axis of the torch body, the asymmetric plasma comprising a higher average plasma temperature adjacent to asymmetrically spaced coils than an average plasma temperature adjacent to other coils of the asymmetric induction device is provided.

In certain embodiments, the induction device comprises a first coil, a second coil and a third coil, in which spacing between the first coil and the second coil is greater than spacing between the second coil and the third coil, and in which the third coil is configured to be positioned closest to a terminus of the torch body. In other embodiments, the induction device comprises a first coil, a second coil and a third coil, in which spacing between the first coil and the second coil is less than spacing between the second coil and the third coil, and in which the third coil is configured to be positioned closest to a terminus of the torch body. In some examples, a radio frequency source electrically coupled to the induction device is present. In other embodiments, the radio frequency source is configured to provide radio frequencies of about 1 MHz to about 1000 MHz at a power of about 10 Watts to about 10,000 Watts. In certain embodiments, a first radio frequency source electrically coupled to at least one coil of the induction device and a second radio frequency source electrically coupled to a different coil of the induction device is present. In other examples, each of the first radio frequency source and the second radio frequency source is configured to provide radio frequencies of about 1 MHz to about 1,000 MHz at a power of about 10 Watts to about 10,000 Watts. In some examples, the induction device comprises a first coil, a second coil and a third coil, in which spacing between the first coil and the second coil is greater than spacing between the second coil and the third coil, and in which the third coil is configured to be positioned closest to a terminus of the torch body, and in which the spacing between each coil is selected to shift a maximum analyte signal to occur at a lower nebulization gas flow rate. In other examples, the induction device comprises a first coil, a second coil and a third coil, in which spacing between the first coil and the second coil is less than spacing between the second coil and the third coil, and in which the third coil is configured to be positioned closest to a terminus of the torch body, and in which the spacing between each coil is selected to shift a maximum analyte signal to occur at a lower nebulization gas flow rate. In certain embodiments, the induction device comprises a first coil, a second coil and a third coil, in which spacing between the first coil and the second coil is less than spacing between the second coil and the third coil, and in which the third coil is configured to be positioned closest to a terminus of the torch body, and in which the spacing between each coil is selected to shift a maximum interfering oxide signal to occur at a higher nebulization gas flow rate.

In another aspect, an asymmetric plasma produced by providing an asymmetric loop current from an asymmetric induction device comprising a plurality of flat plate electrodes configured to receive a portion of a torch body that sustains the asymmetric plasma, in which at least two of the plurality of flat plate electrodes are asymmetrically spaced in a direction substantially parallel to the longitudinal axis of a torch body, the asymmetric plasma comprising a higher average temperature adjacent to asymmetric plate electrodes than an average temperature adjacent to other plate electrodes of the asymmetric induction device is provided.

In certain embodiments, the induction device comprises a first plate electrode, a second plate electrode and a third plate electrode, in which spacing between the first plate electrode and the second plate electrode is greater than spacing between the second plate electrode and the third plate electrode, and in which the third plate electrode is configured to be positioned closest to a terminus of the torch body. In other embodiments, the induction device comprises a first plate electrode, a second plate electrode and a third plate electrode, in which spacing between the first plate electrode and the second plate electrode is less than spacing between the second plate electrode and the third plate electrode, and in which the third plate electrode is configured to be positioned closest to a terminus of the torch body. In additional embodiments, a radio frequency source electrically coupled to the induction device is present. In some examples, the radio frequency source is configured to provide radio frequencies of about 1 MHz to about 1000 MHz at a power of about 10 Watts to about 10,000 Watts. In other examples, a first radio frequency source electrically coupled to at least one plate electrode of the induction device and a second radio frequency source electrically coupled to a different plate electrode of the induction device is present. In some examples, each of the first radio frequency source and the second radio frequency source is configured to provide radio frequencies of about 1 MHz to about 1,000 MHz at a power of about 10 Watts to about 10,000 Watts. In other examples, the induction device comprises a first plate electrode, a second plate electrode and a third plate electrode, in which spacing between the first plate electrode and the second plate electrode is greater than spacing between the second plate electrode and the third plate electrode, and in which the third plate electrode is configured to be positioned closest to a terminus of the torch body, and in which the spacing between each plate electrode is selected to shift a maximum analyte signal to occur at a lower nebulization gas flow rate. In additional examples, the induction device comprises a first plate electrode, a second plate electrode and a third plate electrode, in which spacing between the first plate electrode and the second plate electrode is less than spacing between the second plate electrode and the third plate electrode, and in which the third plate electrode is configured to be positioned closest to a terminus of the torch body, and in which the spacing between each plate electrode is selected to shift a maximum analyte signal to occur at a lower nebulization gas flow rate. In some embodiments, the induction device comprises a first plate electrode, a second plate electrode and a third plate electrode, in which spacing between the first plate electrode and the second plate electrode is less than spacing between the second plate electrode and the third plate electrode, and in which the third plate electrode is configured to be positioned closest to a terminus of the torch body, and in which the spacing between each plate electrode is selected to shift a maximum interfering oxide signal to occur at a higher nebulization gas flow rate.

In another aspect, a chemical reactor comprising a reaction chamber, and an asymmetric induction device configured to provide radio frequency energy to the reaction chamber is provided.

In certain embodiments, the asymmetric induction device comprises a plurality of induction coils in which at least two of the plurality of induction coils are spaced differently than other induction coils. In other embodiments, the asymmetric induction device comprises a plurality of plate electrodes in which at least two of the plurality of plate electrodes are spaced differently than other induction plate electrodes. In some examples, the reactor can include at least one sample introduction system fluidically coupled to the reaction chamber and comprising a first reactant fluid line to permit introduction of a first reactant into the reaction chamber. In some embodiments, the sample introduction system comprises a second reactant fluid line to permit introduction of a second reactant into the reaction chamber. In certain examples, the reactor can include a second sample introduction system fluidically coupled to the reaction chamber to permit introduction of a second reactant into the reaction chamber. In some examples, the reaction chamber comprises at least two compartments. In other examples, a first compartment is adjacent to a first coil of the induction device and a second compartment is adjacent to a second coil and a third coil of the induction device, in which a spacing between the first coil and the second coil is different than a spacing between the second coil and the third coil. In some instances, a first compartment is adjacent to a first plate electrode of the induction device and a second compartment is adjacent to a second plate electrode and a third plate electrode of the induction device, in which a spacing between the first plate and the second plate is different than a spacing between the second plate and the third plate. In certain examples, the reactor can include a second reaction chamber, in which the induction device is configured to provide radio frequency energy to both the reaction chamber and the second reaction chamber.

Additional features, aspects, examples and embodiments are described in more detail below.

BRIEF DESCRIPTION OF THE FIGURES

Certain embodiments of the devices and systems are described with reference to the accompanying figures in which:

FIG. 15 is a table showing the parameters used for testing the asymmetric plate electrodes, in accordance with certain examples;

FIG. 18 is table showing signals for various metals with different plate spacing, in accordance with certain examples.

It will be recognized by the person of ordinary skill in the art, given the benefit of this disclosure, that certain dimensions or features of the components of the systems may have been enlarged, distorted or shown in an otherwise unconventional or non-proportional manner to provide a more user friendly version of the figures.

DETAILED DESCRIPTION

Certain embodiments are described below with reference to singular and plural terms in order to provide a user friendly description of the technology disclosed herein.

These terms are used for convenience purposes only and are not intended to limit the devices, methods and systems described herein.

In certain embodiments, the devices, systems and methods described herein can be used to sustain a plasma within a torch. For example, a carrier gas can be provided to a torch where the carrier gas is ionized by the asymmetric induction device to form a hot plasma (e.g., 5,000-10,000 K or greater). In some examples, the plasma can include a preheating zone, an induction zone, an initial radiation zone, an analytic zone and a plasma tail. By placing closely spaced induction coils or plate electrodes to any one or more of these zones, the temperature of the particular zone can be increased. An atomized sample may be directed to the plasma through a pump, nebulizer and spray chamber. An RF power source can provide RF power to the plasma by way of the asymmetric induction device. In the plasma, excited sample atoms may emit light as the excited atoms decay to a lower state. The emitted light may be collected by collection optics and directed to a spectrometer where it is spectrally resolved. A detector may be operative to detect the spectrally resolved light and provide a signal to a microprocessor and computer network for analysis. In examples where the species do not emit light, an inductively coupled atomic absorption spectrometer may be used to provide light to the atomized species and a detector may be used to detect light absorption by the atomized species. Illustrative atomic absorption spectrometers are available from PerkinElmer Health Sciences, Inc.

Figures 1A, 1B:
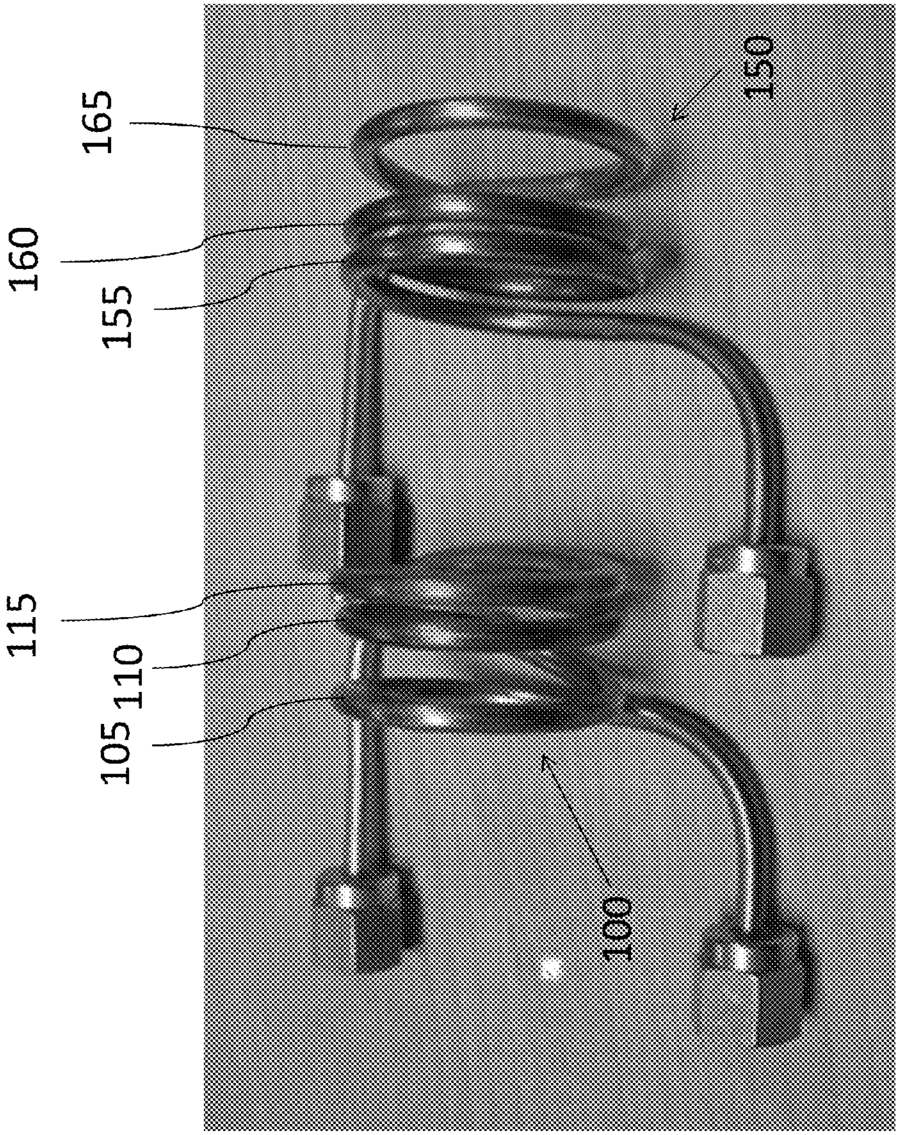
FIGS. 1A and 1B are photographs showing asymmetric induction devices comprising asymmetric coils, in accordance with certain examples.

In certain examples, the devices, systems and methods described herein may include an asymmetric induction device. In some embodiments, the asymmetric induction device may include a variable spacing between different coils or plate electrodes. For example, the spacing between a top reference point of a first coil to the same reference point of a second coil may differ from the spacing between the reference point of the second coil and a reference point of a third coil. Referring to FIG. 1A, a photograph of an induction device comprising three coils is shown. The induction device 100 comprises a first coil 105, a second coil 110 and a third coil 115. The distance from the top of the first coil 105 to the top of the second coil 110 is greater than the distance from the top of the second coil 110 to the third coil 115. While the exact spacing between the coils can vary, in some embodiments, the coil spacing may vary from about 1 mm to about 10 mm, more particularly about 2 mm to about 6 mm, for example about 2 mm to about 4 mm. In some embodiments, the spacing between coils 105, 110 may be about 25%, 30%, 35%, 40%, 45%, 50% or more than the spacing between coils 110, 115. For example, the spacing between coils 110, 115 may be about 2 mm and the spacing between coils 105, 110 may be about 4 mm.

In certain embodiments, the spacing between the coils that provides an asymmetric induction device may be referred to as front spacing or back spacing. A configuration of front spacing is shown in FIG. 1B where the larger space occurs between a terminal coil 165 and a middle coil 160, whereas FIG. 1A represents back spacing where the larger space occurs between coils 105, 110. Referring to FIG. 1B, the front spaced device 150 comprises a first coil 155, a second coil 160 and a third coil 165. Similar to device 100, the exact spacing between the coils 155, 160 and 165 may vary. In certain examples, the coil spacing may vary from about 1 mm to about 10 mm, more particularly about 2 mm to about 6 mm, for example about 2 mm to about 4 mm. In some embodiments, the spacing between coils 160, 165 may be about 25%, 30%, 35%, 40%, 45%, 50% or more than the spacing between coils 155, 160. For example, the spacing between coils 155, 160 may be about 2 mm and the spacing between coils 160, 165 may be about 4 mm.

In certain examples, the coils shown in FIGS. 1A and 1B are generally designed to receive a portion of a torch body within a central aperture of the coils. The torch body can be used to sustain a plasma as radio frequency energy from the coils is provided into the torch body. A radio frequency source (not shown) can be electrically coupled to the coils to provide the radio frequency energy. If desired, the cross-sectional diameter of the coil apertures may be the same of may be different. In some instances, the inner diameter of the coils spaced closer together can be smaller or larger than a coil spaced farther apart. For example and referring again to FIG. 1A, the coils 110, 115 can include an inner diameter that is larger or smaller than the coil 105.

Figure 2:
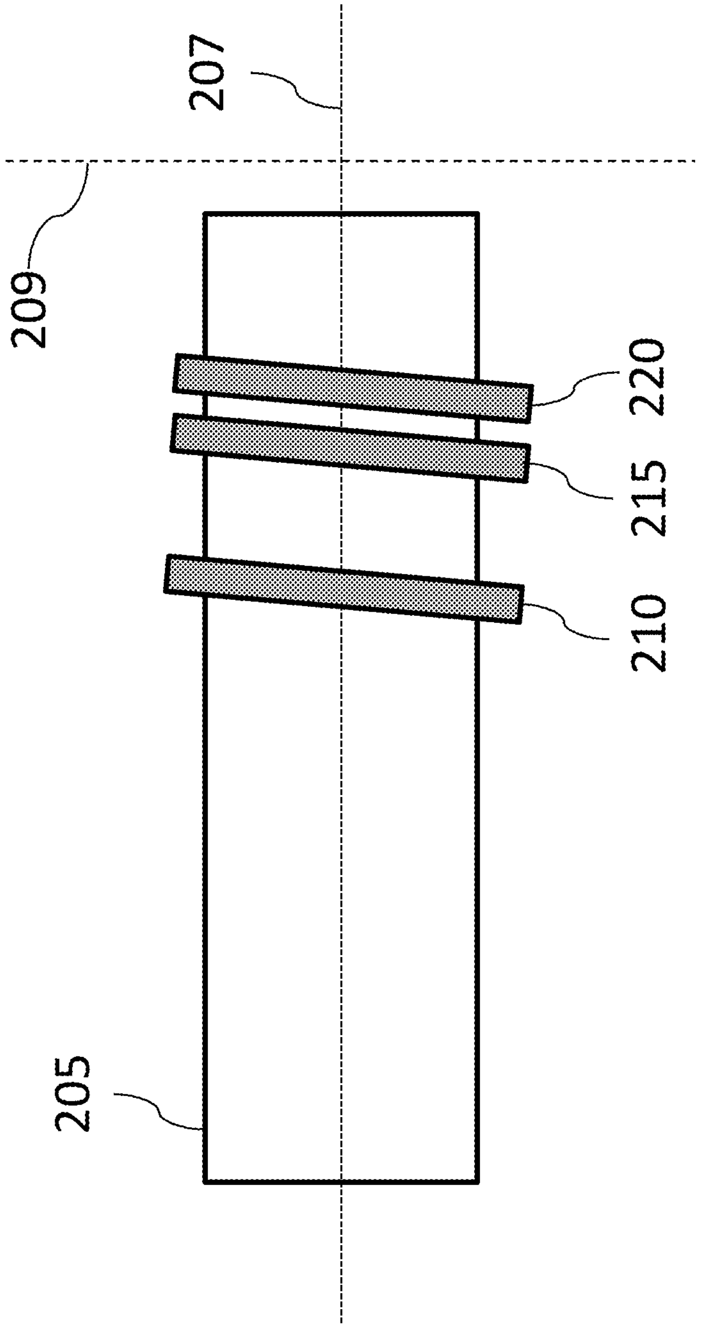
FIG. 2 is an illustration of asymmetrically spaced induction coils, in accordance with certain examples.

In certain embodiments, the induction devices comprising a plurality of coils can be used with a torch body with a longitudinal axis along which a flow of gas is introduced during operation of the torch body and with a radial plane substantially perpendicular to the longitudinal axis of the torch body. For example and referring to FIG. 2, the device comprises a torch body 205 comprising a longitudinal axis 207 and a radial plane 209 substantially perpendicular to the longitudinal axis 207. Induction coils 210, 215 and 220 can provide radio frequency energy into the torch body 205. A portion of the torch body 205 is shown as being positioned with the coils 210, 215 and 220. Coils 215 and 220 are shown as being spaced closer to each other, relative to the longitudinal direction of the torch body 205, than the spacing between coils 210 and 215. If desired, however, the spacing between coils 215, 220 could be greater than the spacing between coils 210, 215. As shown in FIG. 2, coils 215, 220 are closer to the terminus of the torch body 205 than coil 210. While not wishing to be bound by any particular scientific theory, it may be desirable to provide a hotter plasma toward the terminus of the torch body to assist in shifting an analyte signal toward lower nebulization gas flow rates and/or to shift an interfering oxide signal to higher nebulization gas flow rates. By increasing the maximum peak-to-peak separation of an analyte signal and an interfering oxide signal (or other interfering signal), more precise measurements of the analyte signal may be achieved.

Figure 3:
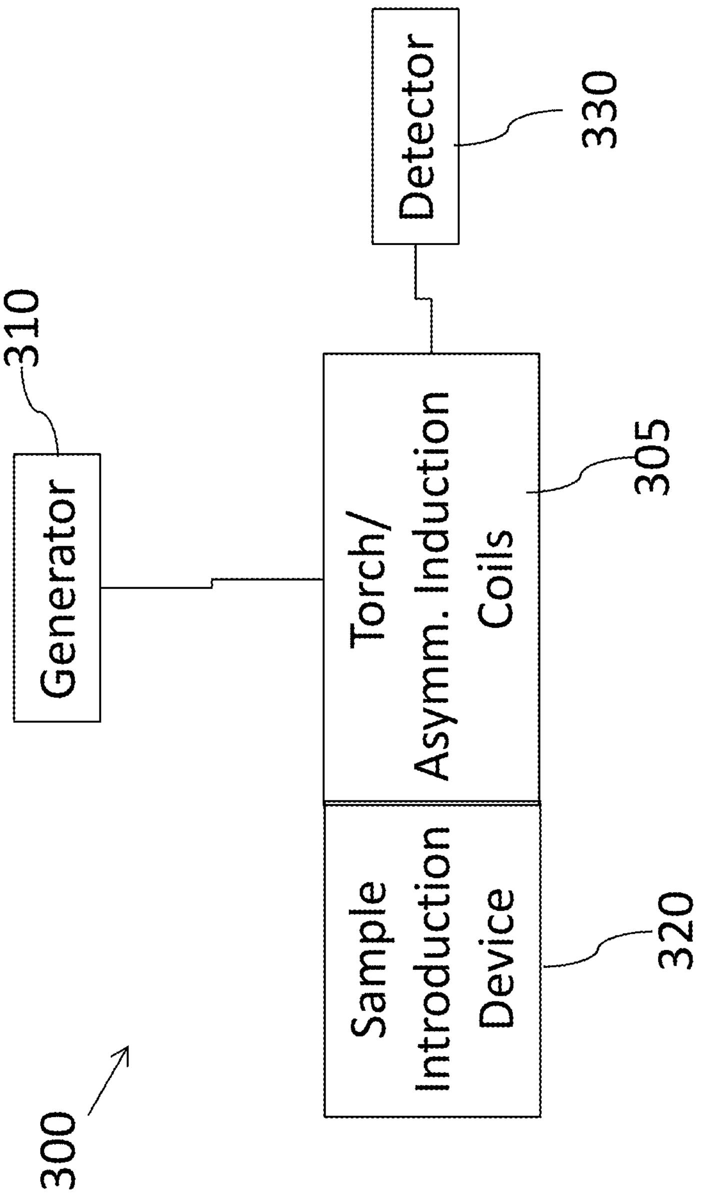
FIG. 3 is a block diagram of a system comprising asymmetric induction coils, in accordance with certain examples.

In certain embodiments, a block diagram of a system that may comprise an induction device comprising a plurality of asymmetrically spaced coils is shown in FIG. 3. The system 300 comprises a torch 305 comprising a plurality of asymmetrically spaced coils. A generator 310, e.g., a radio frequency source, is electrically coupled to the coils to provide radio frequency energy to the coils. In some embodiments, the radio frequency source is configured to provide radio frequencies of about 1 MHz to about 1000 MHz at a power of about 10 Watts to about 10,000 Watts. If desired, two or more radio frequency sources can be present with one electrically coupled to at least one coil of the device and a second radio frequency source electrically coupled to a different coil of the device. Where two or more radio frequency sources are present, each of the first radio frequency source and the second radio frequency source can be configured to provide radio frequencies of about 1 MHz to about 1,000 MHz at a power of about 10 Watts to about 10,000 Watts. In some embodiments, the torch can be fluidically coupled to a sample introduction device 320 and a detector 330. The sample introduction device 320 may comprise, for example, a nebulizer and optionally a spray chamber if desired, though other sample introduction devices may also may also be used. The detector 330 may take many different forms including, but not limited to, an optical excitation detector, an emission detector, an absorption detector, a mass spectrometer or components of a mass spectrometer, e.g., a sampling interface. The induction device used with the torch 305 may include three, four, five or more coils any two of which may be asymmetrically spaced. The particular number of coils and their spacing may be selected based on a desired result. For example, the induction device can include a first coil, a second coil and a third coil, in which spacing between the first coil and the second coil is less than spacing between the second coil and the third coil, and in which the third coil is configured to be positioned closest to a terminus of the torch body, and in which the spacing between each coil is selected to shift a maximum analyte signal to occur at a lower nebulization gas flow rate. In other instances, the induction device may include a first coil, a second coil and a third coil, in which spacing between the first coil and the second coil is greater than spacing between the second coil and the third coil, and in which the third coil is configured to be positioned closest to a terminus of the torch body, and in which the spacing between each coil is selected to shift a maximum interfering oxide signal to occur at a higher nebulization gas flow rate. In other configurations, the device can include a first coil, a second coil and a third coil, in which spacing between the first coil and the second coil is greater than spacing between the second coil and the third coil, and in which the third coil is configured to be positioned closest to a terminus of the torch body, and in which the spacing between each coil is selected to shift a maximum interfering oxide signal to occur at a higher nebulization gas flow rate. Depending on the exact power applied and the position of the coils, different coil spacing and different powers can result in different shifting effects.

Figure 4:
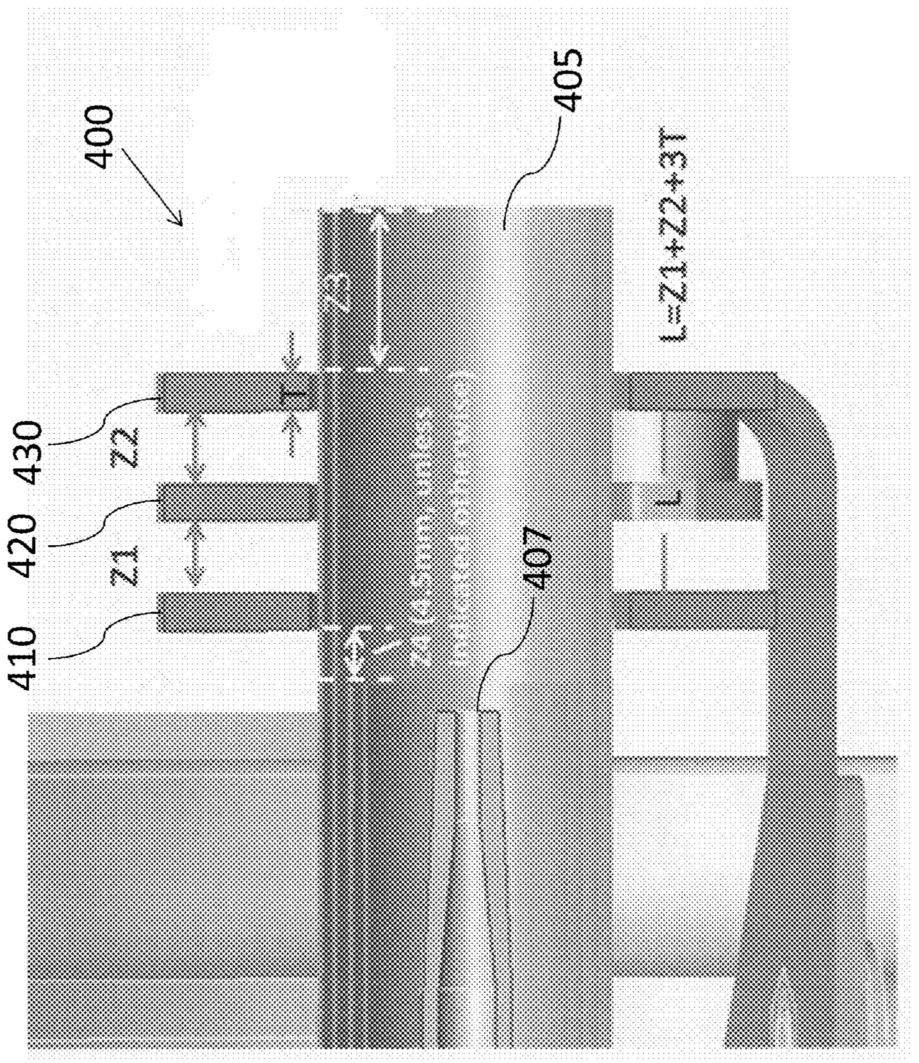
FIG. 4 is an illustration of an asymmetric induction device comprising asymmetrically spaced plate electrodes, in accordance with certain examples.

In certain embodiments, the induction devices described herein may include asymmetrically spaced plate electrodes. Illustrations of plate electrodes are described, for example, in commonly owned U.S. Pat. Nos. 7,106,438 and 8,263,897, the entire disclosure of each of which is hereby incorporated herein by reference for all purposes. One illustration of asymmetrically spaced plate electrodes is shown in FIG. 4. The system 400 comprises three plate electrodes 410, 420 and 430. Plate 410 is separated from plate 420 by a distance Z1, and plate 420 is separated from plate 430 by a distance Z2, where Z1 and Z2 are not equal when an asymmetric induction device is present. In some instances, Z1 is greater than Z2. For example, Z2 may be about 25%, 30%, 35%, 40%, 45%, or 50% of the distance Z1. In other configurations, Z2 is greater than Z1. For example, Z1 may be about 25%, 30%, 35%, 40%, 45%, or 50% of the distance Z2. The thickness T of each plate electrode 410, 420, 430 may be the same or may be different, e.g., may be about 1-5 mm thick, more particularly about 1-3 mm thick, for example 2 mm thick. The overall distance L between the plate 410 and the plate 430 is the sum of Z1, Z2 and the thickness of the plates 410, 420, and 430. As shown in FIG. 4, the terminal plate 430 can be positioned a distance of Z3 from the terminus of a torch body 405. The plate 410 can be positioned a distance Z4 from the terminus of an auxiliary tube 407 of the torch body 405. As described in more detail below, the plates 410, 420 and 430 are electrically coupled to a RF generator (not shown) through legs which provide an electrical path between the plates 410, 420, 430 and the RF generator. If desired, the RF generator can include variable capacitors so the power provided to plasma may be altered depending on the desired spacing of the plates 410, 420 and 430. As shown in FIG. 4, the torch body 405 is positioned within apertures of the plates 410, 420 and 430 and may receive radio frequency energy from the plates 410, 420 and 430. In particular, a loop current can be provided by each plate, and the asymmetric spacing of the plates provides asymmetric loop currents to the torch body 405. Where loop currents are provided from plates which are spaced closer to each other, the temperature of the plasma adjacent to those plates may be increased. For example, a plasma temperature is generally comprised of an excitation temperature and a rotational temperature. Where plates are positioned close to each other, the close spacing may increase the rotational temperature component to a substantial degree in the portion of the plasma adjacent to the closely spaced plates. If desired, the plates 410, 420, 430 can be electrically coupled to different radio frequency sources to permit tuning of each of the plates or two or more of the plates. For example, plates 410 and 420 may be electrically coupled to a first radio frequency energy source, and plate 430 may be electrically coupled to a second radio frequency energy source.

Figure 5:
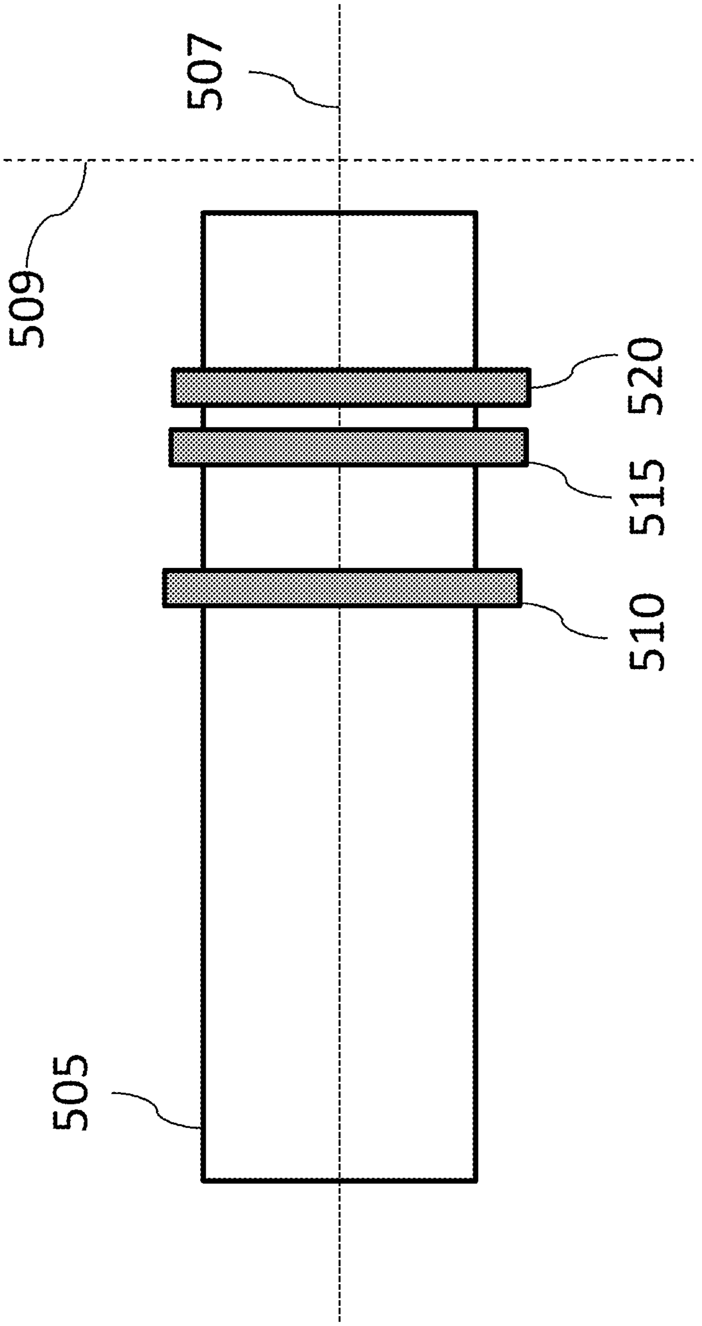
FIG. 5 is an illustration of asymmetrically spaced plate electrodes, in accordance with certain examples.

In certain embodiments, the plate electrodes can be configured with an aperture to receive a portion of a torch body. For example and referring to FIG. 5, a device comprises a torch body 505 comprising a longitudinal axis 507 and a radial plane 509 substantially perpendicular to the longitudinal axis 507. Induction plates 510, 515 and 520 can provide radio frequency energy into the torch body 505. A portion of the torch body 505 is shown as being positioned with the plates 510, 515 and 520. Plates 515 and 520 are shown as being spaced closer to each other, relative to the longitudinal direction of the torch body 505, than the spacing between plates 510 and 515. If desired, however, the spacing between plates 515, 520 could be greater than the spacing between plates 510, 515. As shown in FIG. 5, plates 515, 520 are closer to the terminus of the body 505 than plate 510. While not wishing to be bound by any particular scientific theory, it may be desirable to provide a hotter plasma toward the terminus of the torch body 505 to assist in shifting an analyte signal toward lower nebulization gas flow rates and/or to shift an interfering oxide signal to higher nebulization gas flow rates. By increasing the maximum peak-to-peak separation of an analyte signal and an interfering oxide signal (or other interfering signal), more precise measurements of the analyte signal may be achieved. In comparison to the device of FIG. 2, the plates 510, 515 and 520 may generally be positioned nearly parallel to the radial plane 509 of the torch body 505 to provide a planar asymmetric loop current to the torch body 505. The coiling nature of the induction coils shown in FIG. 2 may result in slight tilting of the loop current, e.g., up to about five or ten degrees, relative to the radial plane of the torch.

Figure 6:
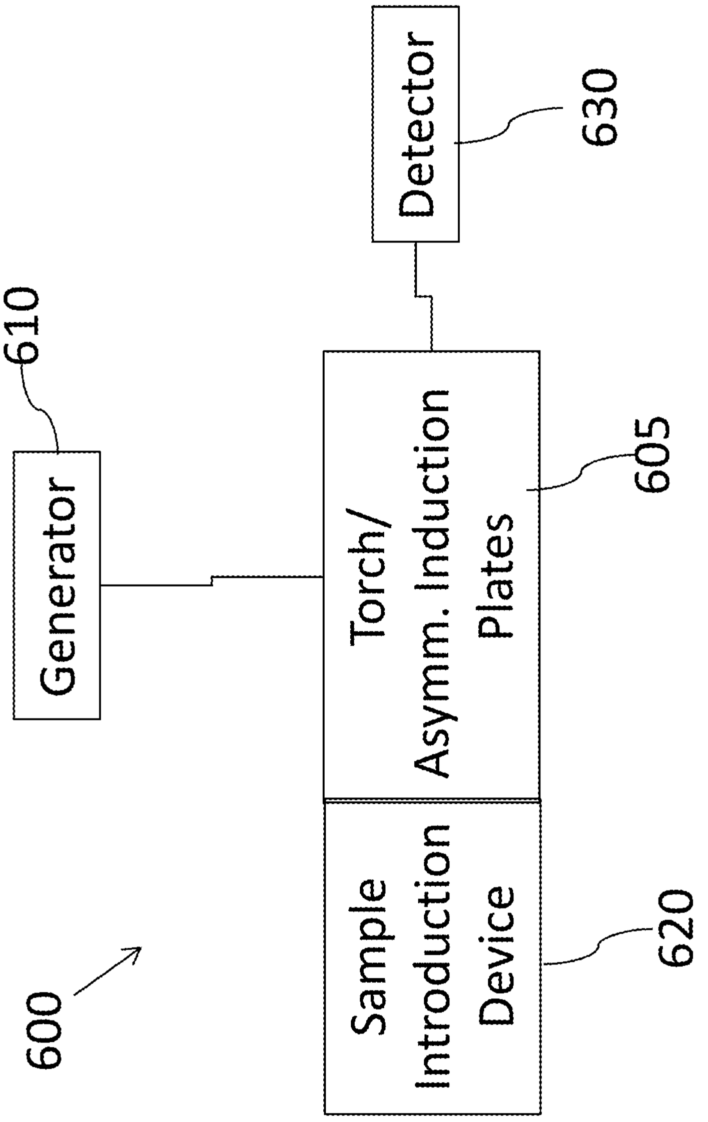
FIG. 6 is a block diagram of a system comprising asymmetric plate electrodes, in accordance with certain examples.

In certain embodiments, the plate electrodes that provide an asymmetric induction device may be used in a system. Referring to FIG. 6, the system 600 comprises a torch 605 comprising a plurality of asymmetrically spaced plates. A generator 610, e.g., a radio frequency source, is electrically coupled to the plates to provide radio frequency energy to the plates. In some embodiments, the radio frequency source is configured to provide radio frequencies of about 1 MHz to about 1000 MHz at a power of about 10 Watts to about 10,000 Watts. If desired, two or more radio frequency sources can be present with one electrically coupled to at least one plate of the device and a second radio frequency source electrically coupled to a different plate of the device. Where two or more radio frequency sources are present, each of the first radio frequency source and the second radio frequency source can be configured to provide radio frequencies of about 1 MHz to about 1,000 MHz at a power of about 10 Watts to about 10,000 Watts. In some embodiments, the torch can be fluidically coupled to a sample introduction device 620 and a detector 630. The sample introduction device 620 may comprise, for example, a nebulizer and optionally a spray chamber if desired, though other sample introduction devices can also be used. The detector 630 may take many different forms including, but not limited to, an optical excitation detector, an emission detector, an absorption detector, a mass spectrometer or components of a mass spectrometer, e.g., a sampling interface. The induction device used with the torch 605 may include three, four, five or more plates any two of which may be asymmetrically spaced. The particular number of plates and their spacing may be selected based on a desired result. For example, the induction device can include a first plate, a second plate and a third plate, in which spacing between the first plate and the second plate is greater than spacing between the second plate and the third plate, and in which the third plate is configured to be positioned closest to a terminus of the torch body, and in which the spacing between each plate is selected to shift a maximum analyte signal to occur at a lower nebulization gas flow rate. In other instances, the induction device may include a first plate, a second plate and a third plate, in which spacing between the first plate and the second plate is less than spacing between the second plate and the third plate, and in which the third plate is configured to be positioned closest to a terminus of the torch body, and in which the spacing between each plate is selected to shift a maximum interfering oxide signal to occur at a higher nebulization gas flow rate. In other configurations, the device can include a first plate, a second plate and a third plate, in which spacing between the first plate and the second plate is greater than spacing between the second plate and the third plate, and in which the third plate is configured to be positioned closest to a terminus of the torch body, and in which the spacing between each plate is selected to shift a maximum interfering oxide signal to occur at a higher nebulization gas flow rate. Depending on the exact power applied and the position of the plates, different plate spacing and different powers can result in different shifting effects.

Figure 7:
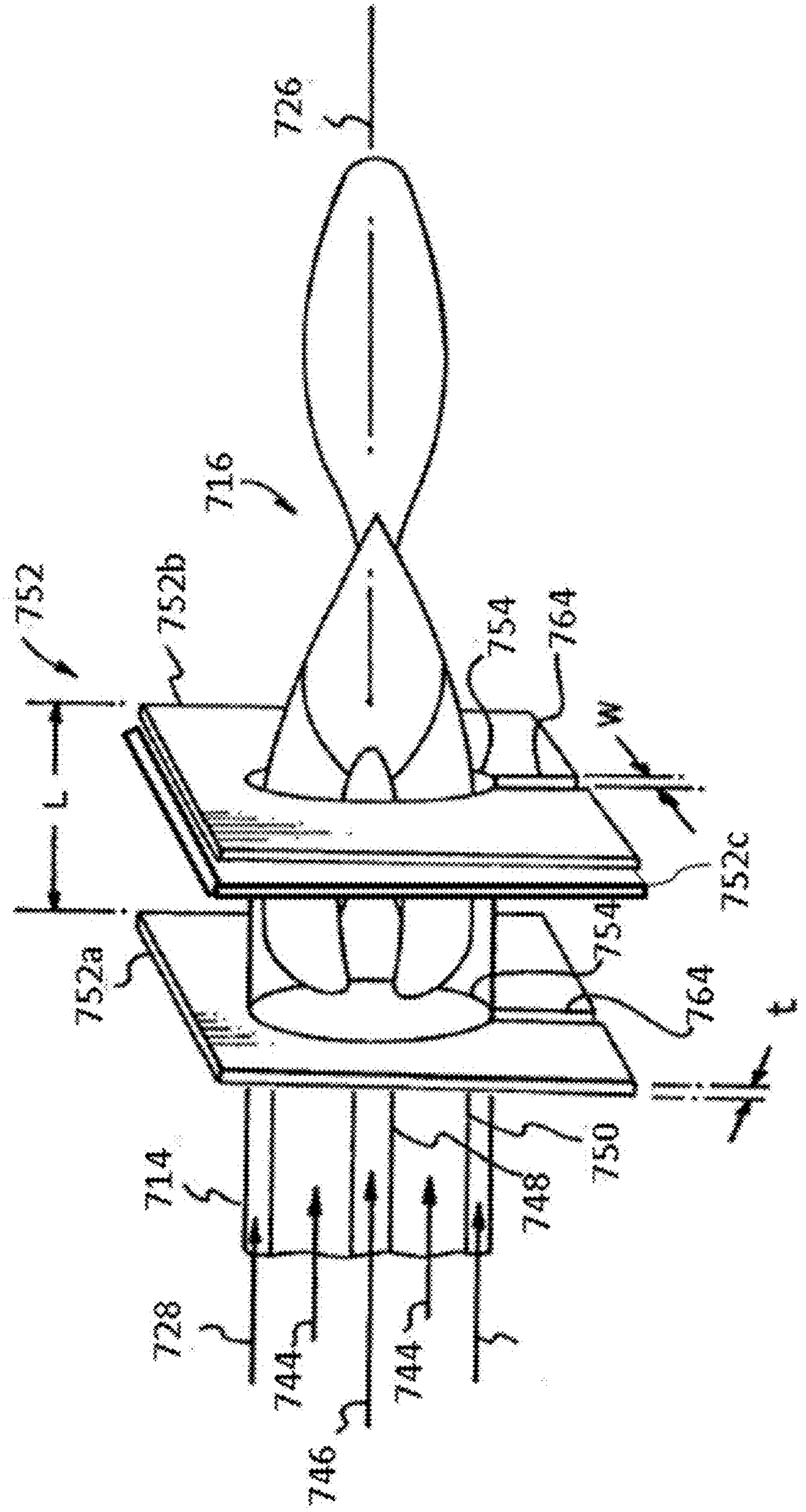
FIG. 7 is an illustration of asymmetric plate electrodes that are configured to receive a torch, in accordance with certain examples.

In certain examples, a more detailed view of a device comprising an asymmetric induction device is shown in FIG. 7. While the device of FIG. 7 comprises three plate electrodes 752*a*, 752*b* and 752*c*, the plate electrodes can be removed and induction coils may instead be used. In FIG. 7, the induction device 752 comprises three substantially parallel plates 752*a*, 752*b*, 752*c* positioned at a total distance 'L' from the first plate to the last plate with plates 752*b* and 752*c* positioned closer to each other than plates 752*a* and 752*b*. The spacing shown in FIG. 7 between plates 752*a* and 752*b* is exaggerated for illustrative purposes, and typically the spacing between plates 752*a* and 752*b* is about 2×, 3× or about 4× the spacing between plates 752*b* and 752*c*. In certain examples, the substantially parallel plates have a width of about 20 mm to about 200 mm, e.g., about 40 mm, and a length of about 30 mm to about 90 mm, e.g., about 70 mm. Each of the parallel plates 752*a*, 752*b* and 752*c* includes an aperture 754 through which the torch 714 may be positioned such that the torch 714, the innermost tube 748, the middle tube 750 and the aperture 754 are aligned along a longitudinal axis 726. The exact dimensions and shapes of the aperture may vary and may be any suitable dimensions and shapes that can accept a torch. For example, the aperture may be generally circular and have a diameter of about 10 mm to about 60 mm, may be square or rectangular shaped and have dimensions of about 20 mm to about 60 mm wide by about 20 mm to about 100 mm long, may be triangular, oval, ovoid, or other suitable geometries. If a small diameter torch is used such as a "low flow" torch then the diameter of the aperture can be reduced proportionally to accommodate the torch. In certain examples, the aperture may be sized such that it is about 0-50% or typically about 3% larger than the torch, whereas in other examples, the torch may contact the plates, e.g., some portion of the torch may contact a surface of a plate, without any substantial operational problems. The substantially parallel plates 752*a*, 752*b* and 752*c* each have a thickness of "t." In some examples, each of plates 752*a*, 752*b* and 752*c* have the same thickness, whereas in other examples plates 752*a*, 752*b* and 752*c* may have different thicknesses. In certain examples, the thickness of the plates is from about 0.025 mm (e.g., such as a metallized plating on an insulator, an example of this would be copper, nickel, silver, or gold plating on a ceramic substrate) to about 20 mm, more particularly, about 0.5 mm to about 5 mm, or any particular thickness within these exemplary ranges. The aperture 754 of the induction device 752 may also include a slot 764, of width 'w' such that the aperture 754 is in communication with its surroundings. The width of the slot may vary from about 0.5 mm to about 20 mm, more particularly, about 1 mm, to about 3 mm, e.g., about 1 mm to about 2 mm.

In accordance with certain examples, the plates and coils may be constructed from the same or different materials. In certain examples, the plates and coils may be constructed from conductive materials such as, for example, aluminum, gold, copper, brass, steel, stainless steel, conductive ceramics and mixtures and alloys thereof. In other examples, the plates and coils may be constructed from non-conductive materials that include a plating or coating of one or more conductive materials. In some examples, the plates or coils may be constructed from materials capable of withstanding high temperatures and resisting melting when exposed to the high circulating currents required to generate the plasma. These and other suitable materials for constructing the plates and coils will be readily selected by the person of ordinary skill in the art, given the benefit of this disclosure. In some embodiments, the plates and/or coils may be produced using an oxidation resistant material, e.g., aluminum, aluminum alloys, oxidation resistant paramagnetic materials, and other suitable materials some of which are described, for example, in U.S. Patent Application Publication No. 20110273260, the entire disclosure of which is hereby incorporated herein by reference.

Figure 8:
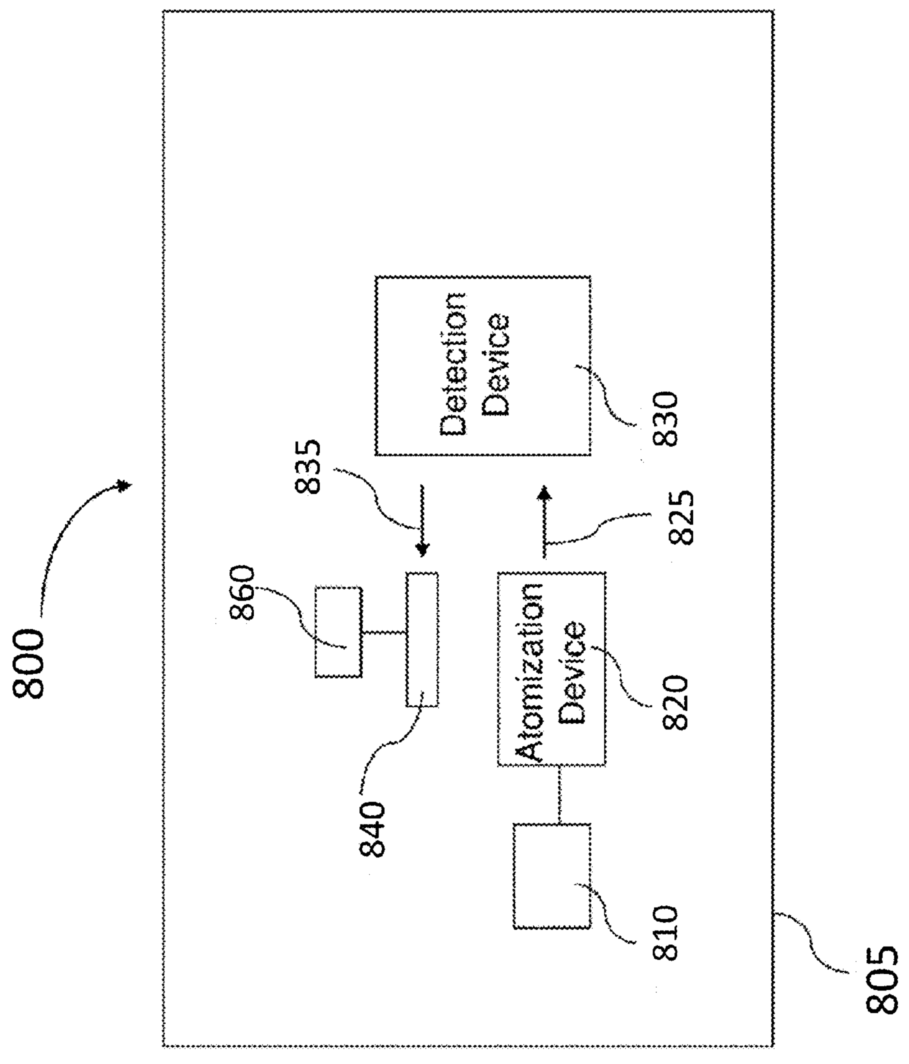
FIG. 8 is a diagram of an optical emission system comprising an asymmetric induction device, in accordance with certain examples.

In certain examples, the asymmetric induction devices described herein can be used in optical emission spectrometer (OES), as shown in FIG. 8. As chemical species are atomized and/or ionized, the outermost electrons may undergo transitions which may emit light (potentially including non-visible light). For example, when an electron of an atom is in an excited state, the electron may emit energy in the form of light as it decays to a lower energy state. Suitable wavelengths for monitoring optical emission from excited atoms and ions will be readily selected by the person of ordinary skill in the art, given the benefit of this disclosure. Exemplary optical emission wavelengths include, but are not limited to, 396.152 nm for aluminum, 193.696 nm for arsenic, 249.772 nm for boron, 313.107 nm for beryllium, 214.440 nm for cadmium, 238.892 nm for cobalt, 267.716 nm for chromium, 224.700 nm for copper, 259.939 nm for iron, 257.610 nm for manganese, 202.031 nm for molybdenum, 231.604 nm for nickel, 220.353 nm for lead, 206.836 nm for antimony, 196.206 nm for selenium, 190.801 nm for tantalum, 309.310 nm for vanadium and 206.200 nm for zinc. The exact wavelength of optical emission may be red-shifted or blue-shifted depending on the state of the species, e.g., atom, ion, etc., and depending on the difference in energy levels of the decaying electron transition, as known in the art.

Referring to FIG. 8 again, an OES device 800 includes a housing 805, a sample introduction device 810, an atomization device 820 comprising an asymmetric induction device (not shown), which typically is used to sustain an inductively coupled plasma, and a detection device 830. The sample introduction device 810 may vary depending on the nature of the sample. In certain examples, the sample introduction device 810 may be a nebulizer that is configured to aerosolize liquid sample for introduction into the atomization device 820. In other examples, the sample introduction device 810 may be an injector configured to receive sample that may be directly injected or introduced into the atomization device. If desired, the sample introduction device 810 can include a low-flow injector as described, for example, in commonly owned U.S. patent application Ser. No. 13/100,416 filed on May 4, 2011, the entire disclosure of which is hereby incorporated herein by reference. Other suitable devices and methods for introducing samples will be readily selected by the person of ordinary skill in the art, given the benefit of this disclosure. The atomization device 820 typically is a plasma that includes an asymmetric induction device as described herein. The atomization device can include a conventional Fassel torch or can include a low-flow plasma torch, if desired. Illustrative types of low flow torches are described in U.S. patent application Ser. No. 13/100,416. The detection device 830 may take numerous forms and may be any suitable device that may detect optical emissions, such as optical emission 825. For example, the detection device 830 may include suitable optics, such as lenses, mirrors, prisms, windows, band-pass filters, etc. The detection device 830 may also include gratings, such as echelle gratings, to provide a multi-channel OES device. Gratings such as echelle gratings may allow for simultaneous detection of multiple emission wavelengths. The gratings may be positioned within a monochromator or other suitable device for selection of one or more particular wavelengths to monitor. In certain examples, the detection device 830 may include a charge coupled device (CCD), a flat panel detector or other suitable types of detectors. In other examples, the OES device may be configured to implement Fourier transforms to provide simultaneous detection of multiple emission wavelengths. The detection device may be configured to monitor emission wavelengths over a large wavelength range including, but not limited to, ultraviolet, visible, near and far infrared, etc. The OES device 800 may further include suitable electronics such as a microprocessor and/or computer and suitable circuitry to provide a desired signal and/or for data acquisition. Suitable additional devices and circuitry are known in the art and may be found, for example, on commercially available OES devices such as Optima 2100DV series and Optima 5000 DV series OES devices commercially available from PerkinElmer Health Sciences, Inc. The optional amplifier 840 may be operative to increase a signal 835, e.g., amplify the signal from detected photons, and provides the signal to display 850, which may be a readout, computer, etc. In examples where the signal 835 is sufficiently large for display or detection, the amplifier 840 may be omitted. In certain examples, the amplifier 840 is a photomultiplier tube configured to receive signals from the detection device 830. Other suitable devices for amplifying signals, however, will be selected by the person of ordinary skill in the art, given the benefit of this disclosure. It will also be within the ability of the person of ordinary skill in the art, given the benefit of this disclosure, to retrofit existing OES devices with the atomization devices disclosed here and to design new OES devices using the atomization devices disclosed here. The OES devices may further include autosamplers, such as AS90 and AS93 autosamplers commercially available from PerkinElmer Health Sciences, Inc. or similar devices available from other suppliers.

In certain embodiments, the asymmetric induction devices described herein can be used in an atomic absorption (AA) spectrometer. Atoms and ions in or exiting the plasma may absorb certain wavelengths of light to provide energy for a transition from a lower energy level to a higher energy level. An atom or ion may contain multiple resonance lines resulting from transition from a ground state to a higher energy level. The energy needed to promote such transitions may be supplied using numerous sources, e.g., heat, flames, plasmas, arc, sparks, cathode ray lamps, lasers, etc., as discussed further below. Suitable sources for providing such energy and suitable wavelengths of light for providing such energy will be readily selected by the person of ordinary skill in the art, given the benefit of this disclosure.

Figure 9:
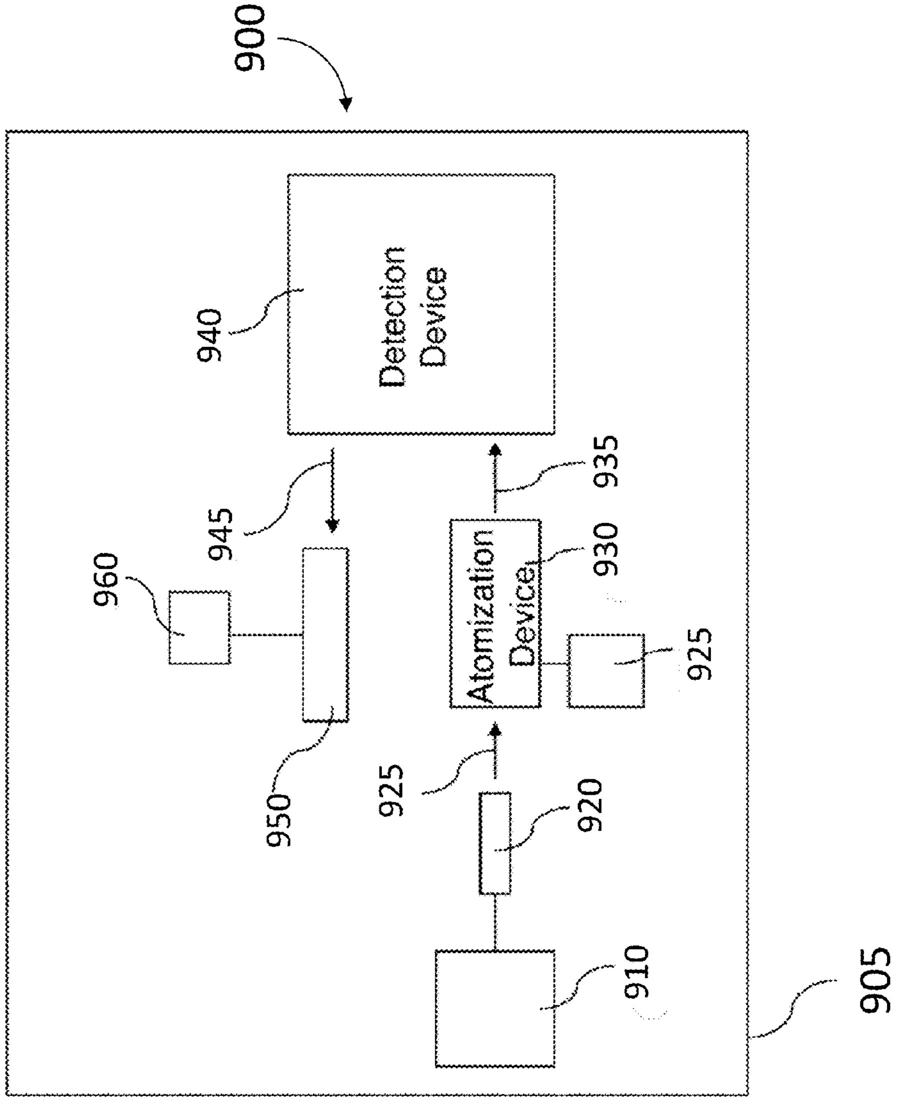
FIG. 9 is a diagram of an atomic absorption system comprising an asymmetric induction device, in accordance with certain examples.

In some examples, one illustration of an atomic absorption spectrometer is shown in FIG. 9. The single beam AA device 900 includes a housing 905, a power source 910, a lamp 920, a sample introduction device 925, an atomization device comprising an asymmetric induction device 930, a detection device 940, an optional amplifier 950 and a display 960. The power source 910 may be configured to supply power to the lamp 920, which provides one or more wavelengths of light 922 for absorption by atoms and ions. Suitable lamps include, but are not limited to mercury lamps, cathode ray lamps, lasers, etc. The lamp may be pulsed using suitable choppers or pulsed power supplies, or in examples where a laser is implemented, the laser may be pulsed with a selected frequency, e.g., 5, 10, or 20 times/second. The exact configuration of the lamp 920 may vary. For example, the lamp 920 may provide light axially along the atomization device 930 or may provide light radially along the atomization device 930. The example shown in FIG. 9 is configured for axial supply of light from the lamp 920. There may be signal-to-noise advantages using axial viewing of signals, as described in the commonly assigned applications incorporated herein by reference. The atomization device 930 typically includes an asymmetric induction device as described herein and a plasma torch. As described in reference to FIG. 8, the plasma torch may be a conventional plasma torch or a low-flow plasma torch, and the sample introduction device 925 can, if desired, include or use a low-flow injector. As sample is atomized and/or ionized in the atomization device 930, the incident light 922 from the lamp 920 may excite atoms. That is, some percentage of the light 922 that is supplied by the lamp 920 may be absorbed by the atoms and ions in the atomization device 930. The remaining percentage of the light 935 may be transmitted to the detection device 940. The detection device 940 may provide one or more suitable wavelengths using, for example, prisms, lenses, gratings and other suitable devices such as those discussed above in reference to the OES devices, for example. The signal may be provided to the optional amplifier 950 for increasing the signal provided to the display 960. To account for the amount of absorption by sample in the atomization device 930, a blank, such as water, may be introduced prior to sample introduction to provide a 100% transmittance reference value. The amount of light transmitted once sample is introduced into atomization chamber may be measured, and the amount of light transmitted with sample may be divided by the reference value to obtain the transmittance. The negative $\log_{10}$ of the transmittance is equal to the absorbance. AA device 900 may further include suitable electronics such as a microprocessor and/or computer and suitable circuitry to provide a desired signal and/or for data acquisition. Suitable additional devices and circuitry may be found, for example, on commercially available AA devices such as AAnalyst series spectrometers commercially available from PerkinElmer Health Sciences, Inc. It will also be within the ability of the person of ordinary skill in the art, given the benefit of this disclosure, to retrofit existing AA devices with the atomization devices disclosed here and to design new AA devices using the atomization devices disclosed here. The AA devices may further include autosamplers known in the art, such as AS-90A, AS-90plus and AS-93plus autosamplers commercially available from PerkinElmer Health Sciences, Inc.

Figure 10:
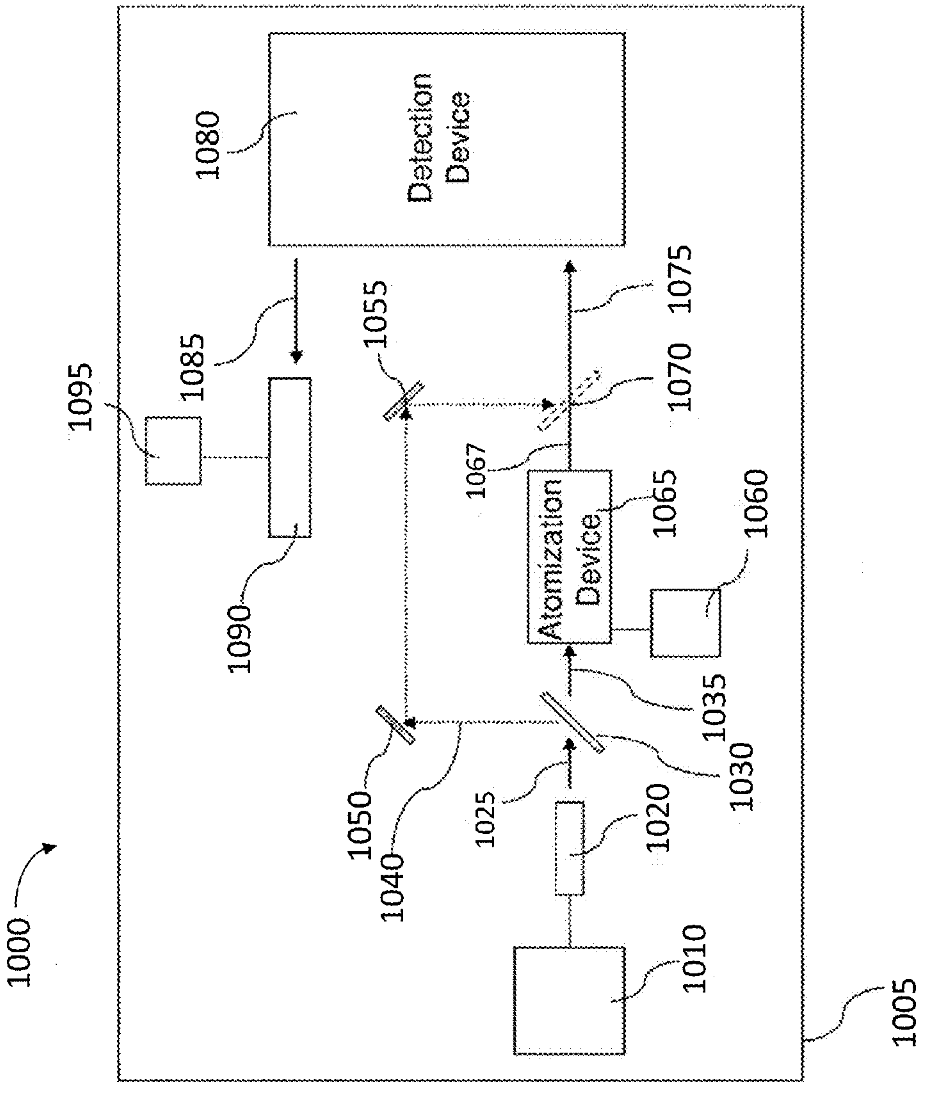
FIG. 10 is a diagram of another atomic absorption system comprising an asymmetric induction device, in accordance with certain examples.

In certain embodiments, the asymmetric induction devices described herein can be used in a dual beam AA device. Referring to FIG. 7, a dual beam AA device 1000 includes a housing 1005, a power source 1010, a lamp 1020, an atomization device comprising an asymmetric induction device 1065, a detection device 1080, an optional amplifier 1090 and a display 1095. The power source 1010 may be configured to supply power to the lamp 1020, which provides one or more wavelengths of light 1025 for absorption by atoms and ions. Suitable lamps include, but are not limited to, mercury lamps, cathode ray lamps, lasers, etc. The lamp may be pulsed using suitable choppers or pulsed power supplies, or in examples where a laser is implemented, the laser may be pulsed at a selected frequency, e.g., 5, 10 or 20 times/second. The configuration of the lamp 1020 may vary. For example, the lamp 1020 may provide light axially along the atomization device 1065 or may provide light radially along the atomization device 1065. The example shown in FIG. 10 is configured for axial supply of light from the lamp 1020. As discussed above, there may be signal-to-noise advantages using axial viewing of signals. The atomization device 1065 may be an inductively coupled plasma that includes an asymmetric induction device. If desired, the torch of the atomization device 1065 may be a conventional torch or a low-flow plasma torch as described in reference to FIG. 8, and any sample introduction device (not shown) that is used may include conventional injector or a low-flow injector. As sample is atomized and/or ionized in the atomization device 1065, the incident light 1025 from the lamp 1020 may excite atoms. That is, some percentage of the light 1025 that is supplied by the lamp 1020 may be absorbed by the atoms and ions in the atomization device 1065. The remaining percentage of the light 1067 is transmitted to the detection device 1080. In examples using dual beams, the incident light 1025 may be split using a beam splitter 1030 such that some percentage of light, e.g., about 10% to about 90%, may be transmitted as a light beam 1035 to the atomization device 1065 and the remaining percentage of the light may be transmitted as a light beam 1040 to lenses 1050 and 1055. The light beams may be recombined using a combiner 1070, such as a half-silvered mirror, and a combined signal 1075 may be provided to the detection device 1080. The ratio between a reference value and the value for the sample may then be determined to calculate the absorbance of the sample. The detection device 1080 may provide one or more suitable wavelengths using, for example, prisms, lenses, gratings and other suitable devices known in the art, such as those discussed above in reference to the OES devices, for example. Signal 1085 may be provided to the optional amplifier 790 for increasing the signal for provide to the display 1095. AA device 1000 may further include suitable electronics known in the art, such as a microprocessor and/or computer and suitable circuitry to provide a desired signal and/or for data acquisition. Suitable additional devices and circuitry may be found, for example, on commercially available AA devices such as AAnalyst series spectrometers commercially available from PerkinElmer Health Sciences, Inc. It will be within the ability of the person of ordinary skill in the art, given the benefit of this disclosure, to retrofit existing dual beam AA devices with the induction devices disclosed here and to design new dual beam AA devices using the asymmetric induction devices disclosed here. The AA devices may further include autosamplers known in the art, such as AS-90A, AS-90plus and AS-93plus autosamplers commercially available from PerkinElmer Health Sciences, Inc.

Figure 11:
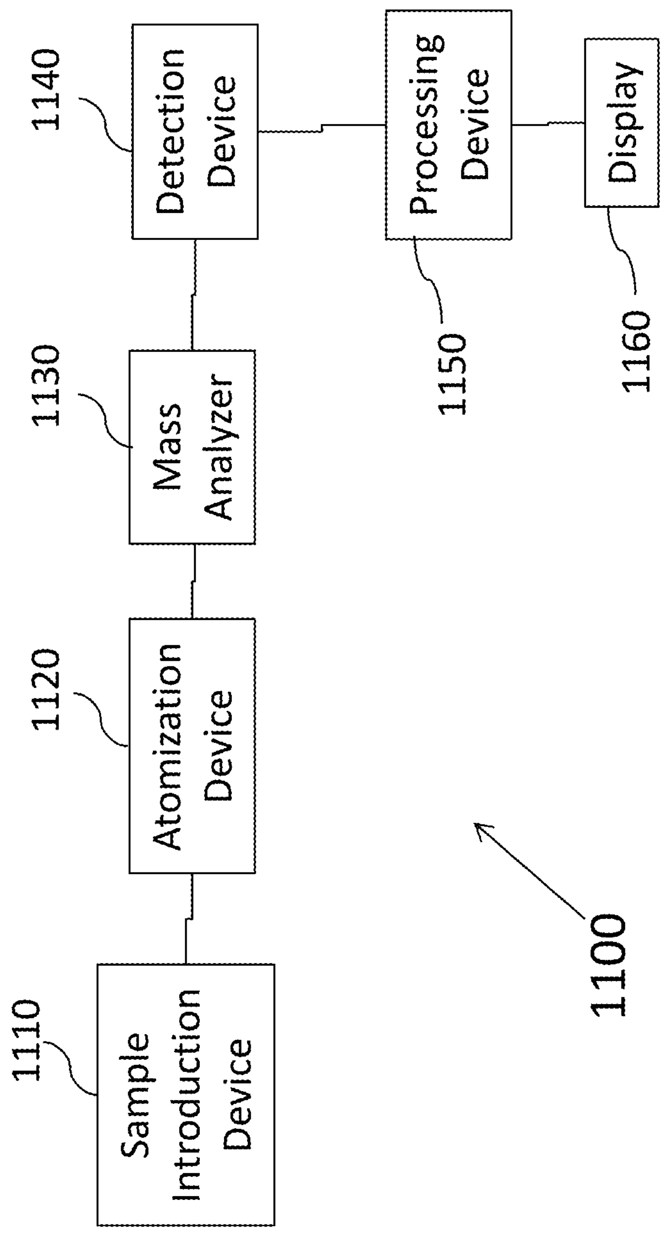
FIG. 11 is a block diagram of a mass spectrometer comprising an asymmetric induction device, in accordance with certain examples.

In certain embodiments, the asymmetric induction devices described herein can be used in a mass spectrometer. When the asymmetric induction devices are used in a mass spectrometer, there can be a reduced chance of oxide formation and a reduced likelihood of contamination from such oxides. An illustrative MS device is shown in FIG. 11. The MS device 1100 includes a sample introduction device 1110, an atomization device 1120, a mass analyzer 1130, a detection device 1140, a processing device 1150 and a display 1160. The sample introduction device 1110, the atomization device comprising an asymmetric induction device 1120, the mass analyzer 1130 and the detection device 1140 may be operated at reduced pressures using one or more vacuum pumps. In certain examples, however, only the mass analyzer 1130 and the detection device 1140 may be operated at reduced pressures. The sample introduction device 1110 may include an inlet system configured to provide sample to the atomization device 1120. The inlet system may include one or more batch inlets, direct probe inlets and/or chromatographic inlets. The sample introduction device 1110 may be an injector, a nebulizer or other suitable devices that may deliver solid, liquid or gaseous samples to the atomization device 1120. If desired, the sample introduction device 1110 can include a low-flow injector as described in reference to FIGS. 8-10. The atomization device 1120 may be a device including an asymmetric induction device such as, for example, an inductively coupled plasma device that is sustained a torch body using an asymmetric induction device as discussed herein. Any torch present in the atomization device 1120 may be a conventional plasma torch or may be a low-flow plasma torch as described herein. The mass analyzer 1130 may take numerous forms depending generally on the sample nature, desired resolution, etc., and exemplary mass analyzers are discussed further below. The detection device 1140 may be any suitable detection device that may be used with existing mass spectrometers, e.g., electron multipliers, Faraday cups, coated photographic plates, scintillation detectors, etc., and other suitable devices that will be selected by the person of ordinary skill in the art, given the benefit of this disclosure. The processing device 1150 typically includes a microprocessor and/or computer and suitable software for analysis of samples introduced into MS device 1100. One or more databases may be accessed by the processing device 1150 for determination of the chemical identity of species introduced into MS device 1100. Other suitable additional devices known in the art may also be used with the MS device 1100 including, but not limited to, autosamplers, such as AS-90plus and AS-93plus autosamplers commercially available from PerkinElmer Health Sciences, Inc.

In certain embodiments, the mass analyzer 1130 of the MS device 1100 may take numerous forms depending on the desired resolution and the nature of the introduced sample. In certain examples, the mass analyzer is a scanning mass analyzer, a magnetic sector analyzer (e.g., for use in single and double-focusing MS devices), a quadrupole mass analyzer, an ion trap analyzer (e.g., cyclotrons, quadrupole ions traps), time-of-flight analyzers (e.g., matrix-assisted laser desorbed ionization time of flight analyzers), and other suitable mass analyzers that may separate species with different mass-to-charge ratios. The asymmetric induction devices may be used in MS devices that include many different types of ionization methods. For example, electron impact sources, chemical ionization sources, field ionization sources, desorption sources such as, for example, those sources configured for fast atom bombardment, field desorption, laser desorption, plasma desorption, thermal desorption, electrohydrodynamic ionization/desorption, etc., can be used. In yet other examples, thermospray ionization sources, electrospray ionization sources or other ionization sources and devices commonly used in mass spectroscopy can be used with the asymmetric induction devices described herein.

In some examples, the MS devices disclosed herein may be hyphenated with one or more other analytical techniques. For example, MS devices may be hyphenated with devices for performing liquid chromatography, gas chromatography, capillary electrophoresis, and other suitable separation techniques. When coupling an MS device with a gas chromatograph, it may be desirable to include a suitable interface, e.g., traps, jet separators, etc., to introduce sample into the MS device from the gas chromatograph. When coupling an MS device to a liquid chromatograph, it may also be desirable to include a suitable interface to account for the differences in volume used in liquid chromatography and mass spectroscopy. For example, split interfaces may be used so that only a small amount of sample exiting the liquid chromatograph may be introduced into the MS device. Sample exiting from the liquid chromatograph may also be deposited in suitable wires, cups or chambers for transport to the atomization devices of the MS device. In certain examples, the liquid chromatograph may include a thermospray configured to vaporize and aerosolize sample as it passes through a heated capillary tube. Other suitable devices for introducing liquid samples from a liquid chromatograph into a MS device will be readily selected by the person of ordinary skill in the art, given the benefit of this disclosure. In certain examples, MS devices, at least one of which includes an asymmetric induction device, can be hyphenated with each other for tandem mass spectroscopy analyses. For example, one MS device may include a first type of mass analyzer and the second MS device may include a different or similar mass analyzer as the first MS device. In other examples, the first MS device may be operative to isolate the molecular ions, and the second MS device may be operative to fragment/detect the isolated molecular ions. It will be within the ability of the person of ordinary skill in the art, given the benefit of this disclosure, to design hyphenated MS/MS devices at least one of which includes an asymmetric induction device.

In certain embodiments, the asymmetric induction devices described herein can be used with a chemical reaction chamber to provide different local temperatures within the chemical reaction chamber. For example, two plates or coils may be spaced closely together at one end of a reaction chamber to favor certain reaction products over other reaction products. In some instances, an increased temperature region of the reaction chamber may be effective to promote formation of a desired reaction product. The reaction chamber can be fluidically coupled to one or more reactant streams or fluids to permit introduction of reactants into the chamber. The reaction chamber can include one or more asymmetric induction devices. For example, an asymmetric induction device comprising plates or coils can surround some portion of the reaction chamber to sustain a plasma within the reaction chamber. In some examples, the plasma may first render the reactants in a gaseous state where they may be permitted to react to provide a desired product. In other instances, the reactants may first react and the resulting product may be provided to the plasma where another additional product may then be formed. It will be within the ability of the person of ordinary skill in the art, given the benefit of this disclosure, to use the asymmetric induction devices with a reaction chamber.

Figure 12:
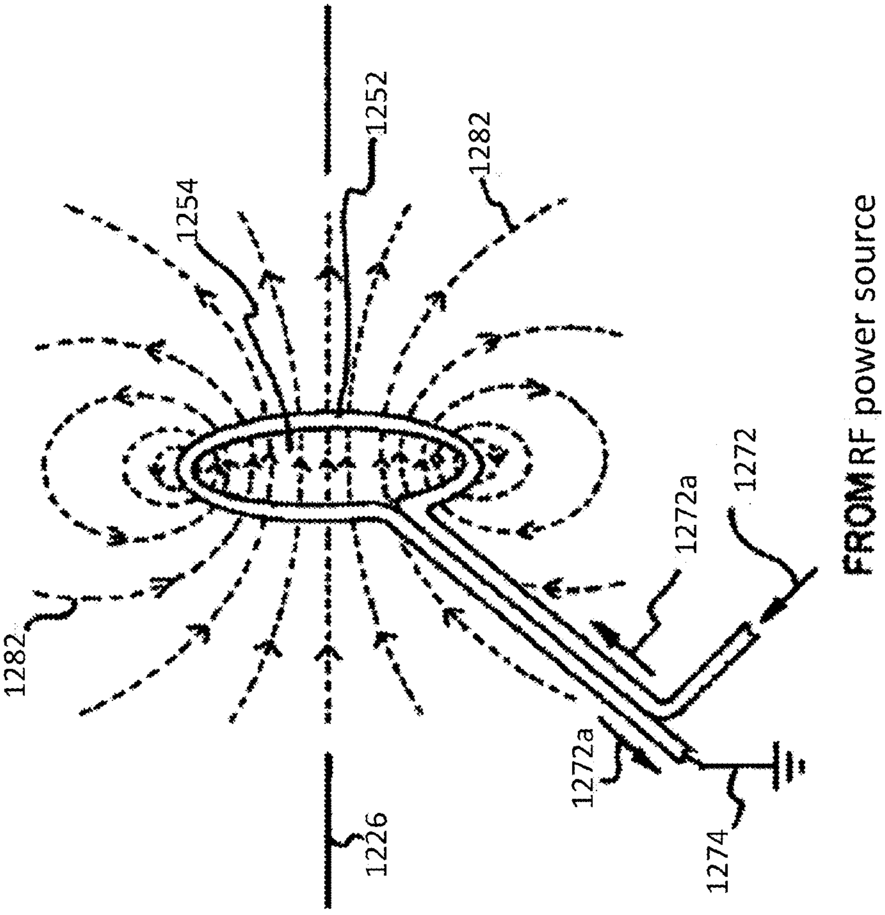
FIG. 12 is an illustration of a loop current, in accordance with certain examples.

In certain embodiments, the asymmetric devices described herein may provide an asymmetric loop current to a torch body or a reaction chamber or other suitable devices. For example, the asymmetric induction devices can provide a loop current to a torch body from an induction device comprising a plurality of induction coils or a plurality of plate electrodes configured to sustain a plasma in the torch body. The coils or plates each can provide a loop current and in which at least two of the provided loop currents are asymmetrically spaced from each other along a direction that is substantially parallel to the longitudinal axis of the torch body. For illustration purposes and referring to FIG. 12, an illustration of a loop current provided by a single plate or single coil is shown. For reference purposes, the plate or coil is represented in FIG. 12 as a wire 1252 with an aperture 1254. An RF current 1272 supplied from an RF power source (not shown) creates a planar loop current **1272*a*, which generates a toroidal magnetic field 1282 through the aperture 1254. The other leg of the wire 1252 may be coupled to ground 1274 or a grounding plate. The planar current loop may be substantially parallel to a radial plane, which is substantially perpendicular to the longitudinal axis 1226** of the torch. The toroidal magnetic field may be operative to generate and sustain a plasma within a torch (not shown). In a typical plasma, argon gas may be introduced into the torch at flow rates of about 15-20 Liters per minute. A plasma may be generated using a spark or an arc to ignite the argon gas. The toroidal magnetic field causes argon atoms and ions to collide, which results in a superheated environment, e.g., about 5,000-10,000 K or higher, that forms the plasma. Each of the plates or coils of the induction devices described herein may provide a loop current to a torch body. Where two plates are positioned close to each other, the loop current density may be increased in that area which provides an overall asymmetric loop current density to the torch body. For examples, the asymmetric induction device can include a first coil, a second coil and a third coil, in which spacing between the first coil and the second coil is greater than spacing between the second coil and the third coil, and in which the third coil is configured to be positioned closest to a terminus of the torch body. The loop current density provided by the second and third coils may be greater, which can result in an asymmetric loop current being provided and/or generation of an asymmetric plasma. A similar configuration can be implemented using plate electrodes instead of coils to provide an asymmetric loop current and/or generate an asymmetric plasma within the torch body. In some instances, the loop current may be provided in opposite direction as one leg of the induction device is coupled to the positive terminal of a RF power source and the other leg of the induction device is coupled to the negative terminal of the RF power source. Where opposite loop current are provided, a node may exist. The position of this node can be shifted depending on the spacing of the coils or plates to provide a desired plasma shape and/or desired plasma properties.

In some instances, the asymmetric loop current may be effective to sustain an inductively coupled plasma, in which the asymmetric loop current is effective to shift a maximum analyte signal, for a constant concentration of analyte, to a lower nebulization gas flow rate using the asymmetric loop current compared to a nebulization gas flow rate used to provide a maximum analyte signal using a symmetric loop current. Illustrations of shifting the analyte signal and/or shifting an oxide signal are described in more detail below.

Certain specific examples are described in more detail below to illustrate some of the novel aspects and features described herein.

Example 1

Figure 13A:
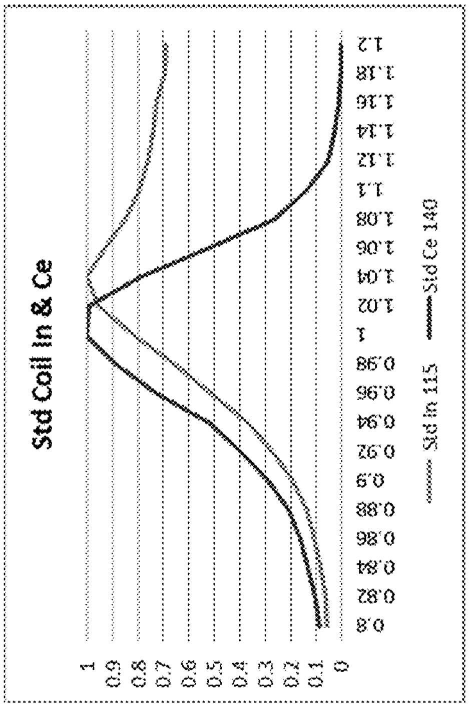
FIGS. 13A-13C are graphs showing shifting of an indium curve with different coil spacing, in accordance with certain examples.
Figure 13B:
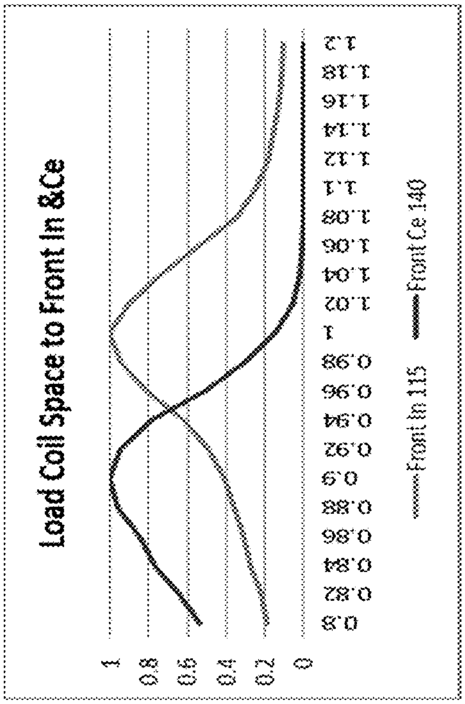
Figure 13C:
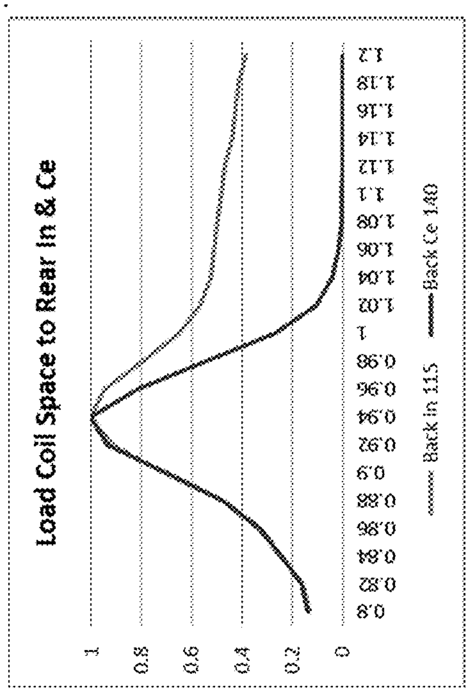

A 3-coil asymmetrically spaced induction device was used on an Elan 6000 instrument to test the effects of providing an asymmetric loop current to a plasma. Referring to FIGS. 13A-13C, several different induction coils were tested. ⅛ inch outer diameter copper was used in the induction coils, but other materials such as aluminum can be used as well. FIG. 13A shows the results of a normalized signal from Indium and Cerium using a 3-coil induction device with equal spacing. FIG. 13B shows the results of spacing the terminal coil further from the first two coils (space to front), and FIG. 13C shows the results of spacing the terminal two coils closer together (space to back).

The results in FIGS. 13A-13C are consistent with being able to shift the analyte curves using different coil spacing. As can be seen when comparing FIGS. 13B and 13C, by spacing the two terminal coils closer to each other, e.g., those coils closer to the exit end of the torch body, better analyte overlap can be achieved, and the analyte signal may be shifted away from an interfering signal (not shown).

Example 2

Figure 14A:
FIGS. 14A-14C are graphs showing shifting of an indium curve with different coil spacing, in accordance with certain examples.
Figure 14B:
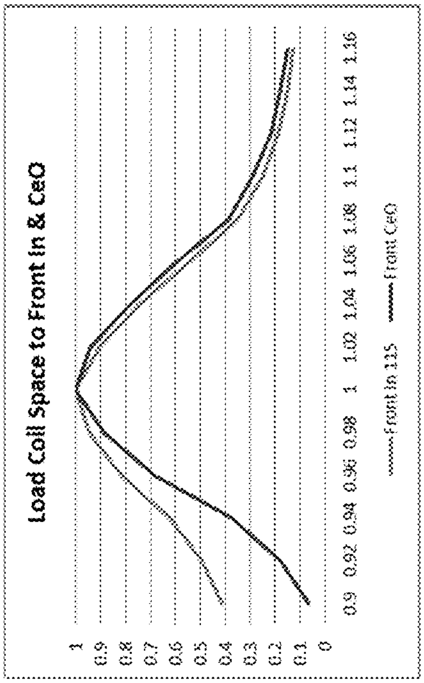
Figure 14C:
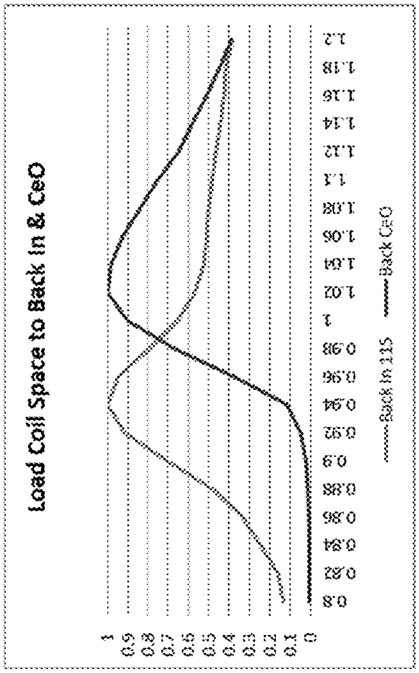

A similar 3-coil setup as used in Example 1 was used to measure the normalized signals from indium and cerium oxide (interfering oxide). The results are shown in FIGS. 14A-14C. As shown in FIG. 14A, using a symmetric coil, the cerium oxide maximum is shifted to the right compared to the maximum signal from the indium. When the spacing between the terminal coil and the first two coils is larger (space to front), the interfering oxide signal overlaps more with the indium signal (see FIG. 14B). When the spacing between the two terminal coils is small (space to back), increased peak-to-peak separation is achieved.

Example 3

3 asymmetrically spaced plate electrodes were used to perform a series of measurements using a Nexion instrument. The instrument parameters are shown in the table in FIG. 15. Unless otherwise noted, the first plate was positioned about 4.5 mm from the auxiliary tube of the torch.

The results of different plate spacing when measuring an indium signal and an oxide ratio (CeO/Ce) signal are shown in FIGS. 16A-16D. The spacing listed at the top of each graph refers to the plate spacing with the first number corresponding to the spacing between the first plate and the second plate, and the second number corresponding to the spacing between the second plate and the third plate. For example, for the results of FIG. 16C, the space between the first plate and the second plate (Z1 in FIG. 4) was 4 mm, and the spacing between the second plate and the third plate (Z2 in FIG. 4) was 2 mm. An overlay of the indium signals is shown in FIG. 17.

Figures 16A, 16B, 16C, 16D:
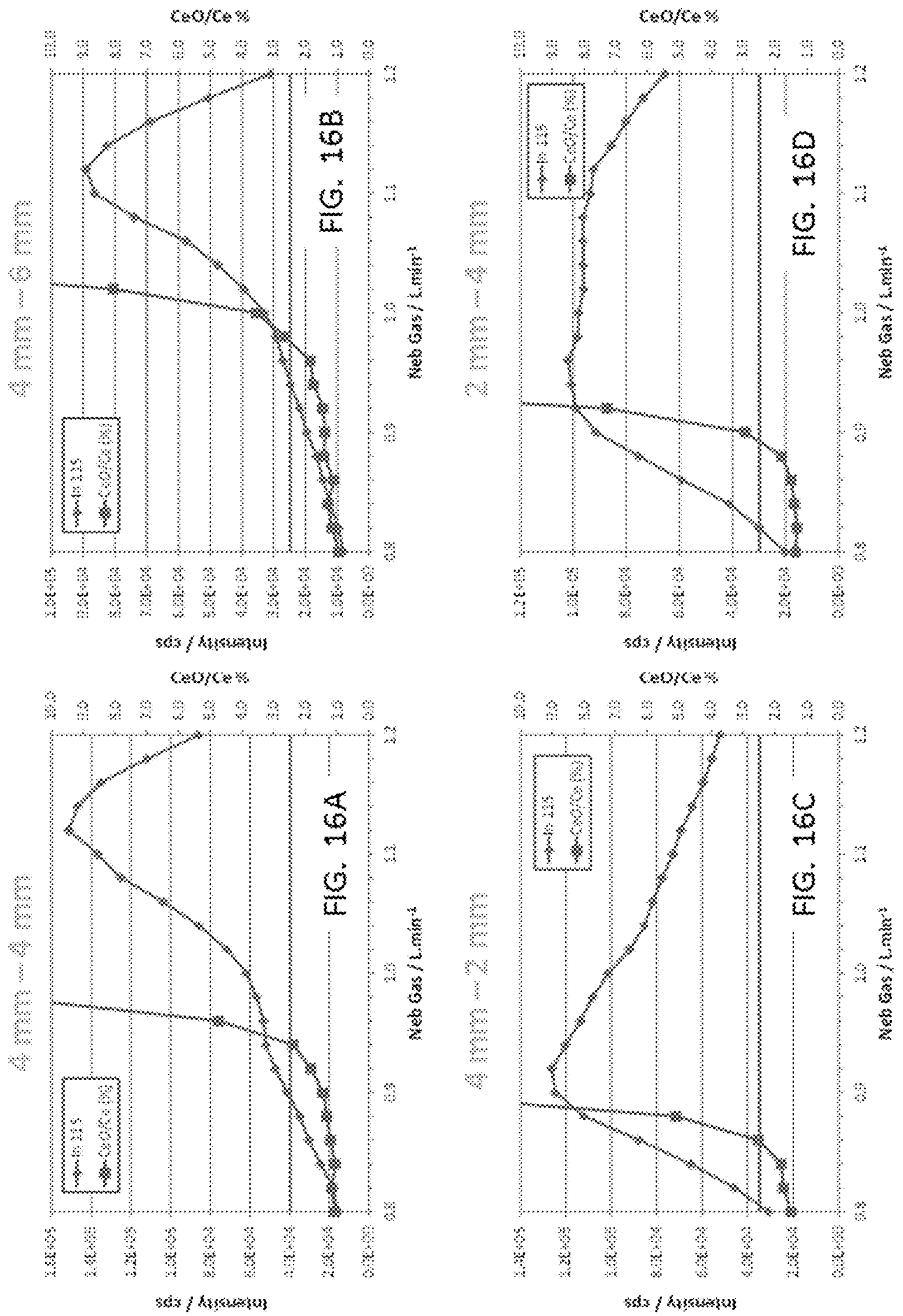
FIGS. 16A-16D are graphs showing shifting of an indium curve with different plate electrode spacing, in accordance with certain examples.
Figure 17:
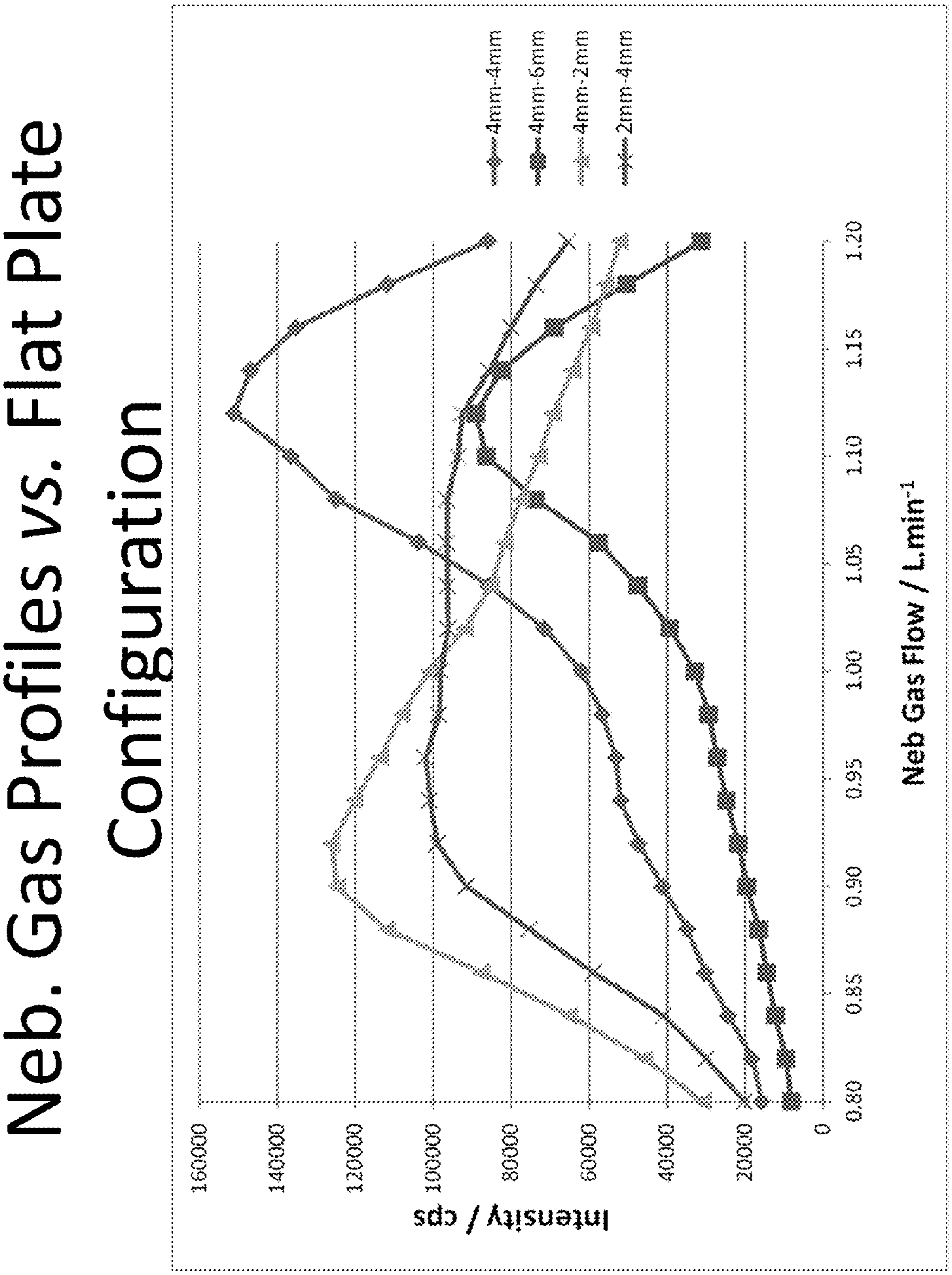
FIG. 17 is an overlay of the indium curves shown in FIGS. 16A-16D, in accordance with certain examples.

Referring to FIG. 16A, the maximum indium signal when using equally spaced plates occurs at a nebulizer gas flow rate of about 1.15 L/minute. The CeO/Ce signal dominates at any nebulizer gas flow of above about 0.95 L/minute, making the indium signal more difficult to measure. Referring to FIG. 16B, as the spacing between the second and third plates increases, there was no substantial change in the signals. As the spacing between either the first plate and the second plate or the second plate and the third plate decreases, the maximum indium signal is shifted to lower nebulization flow rates. For example and referring to FIG. 16C, when the second and third plates are spaced 2 mm apart, the maximum indium signal is shifted to about 0.925 L/minute. Similarly, when the first and second plates are spaced apart by 2 mm, the maximum indium signal is shifted to about 0.95 L/minute. By selecting suitable spacing between the plates, less interfering oxides are produced at lower nebulization rates. For example at about 0.86 L/minute of nebulization gas for the 4 mm-2 mm spacing (see FIG. 16C), the indium signal is over ten times larger than the signal from the CeO/Ce.

Example 4

Several hard to ionize elements were measured using the variable plate electrode spacing as noted in Example 3. The signal intensities of these elements are listed in the table shown in FIG. 18. Much higher signal counts were observed when the spacing between the first and second electrodes or the second and third electrodes was reduced. For example, for beryllium, counts of about 11,030 were measured using a 4 mm-2 mm (Z1-Z2) spacing versus counts of 5,645 using a 4 mm-4 mm spacing (Z1-Z2 spacing). The sampling depth refers to the position between the terminus of torch and the sampling interface. In the test setup used to measure the signals in the table of FIG. 18, the generator is mounted on a movable X, Y, Z stage. The Z position is the position of the stage (referenced as 0) when the end of the load coil or plates is about 11 mm away from the end of the sampling cone of the interface. The top line of the table of FIG. 18 is the spacing between the induction plates. For the second column, the overall length of the induction plates is three induction plates each being 2 mm thick plus 4 mm spacing rear plus 4 mm spacing front has a total induction plate length of 14 mm and the position of the end plate is 11 mm from the sampling cone and the Z position of the stage is 0. The other positions are in reference to this setup. Column number four has a spacing of 4 mm-2 mm, which has an overall induction plate length of 12 mm which relates to having to move the stage −2 mm closer to the interface to maintain 11 mm sampling depth. Since the overall induction plate length of column 5 (2 mm-4 mm spacing) has the same spacing only reversed, the stage position would also be −2 mm closer to the interface. "−" refers to being closer to the interface and "+" as being farther away from the interface. In column 3 (4 mm-6 mm spacing), the spacing plus the plate thickness has an overall induction plate length of 16 mm, but the best results occurred at a sampling depth of about 12 mm rather than 11 mm and the stage position was therefore +3 mm.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A system comprising:

a torch body; and an induction device comprising a plurality of asymmetrically spaced induction coils configured to receive a portion of the torch body to sustain an atomization source in the torch body, in which the asymmetrically spaced induction coils are coupled to each other and form an aperture to receive the portion of the torch body and in which longitudinal spacing, along a longitudinal direction of the torch body, between at least three coils of the plurality of induction coils is asymmetric.

2. The system of claim 1, further comprising a detector fluidically coupled to the torch body and configured to receive analyte species from the atomization source sustained in the torch body.

3. The system of claim 2, in which the detector is selected from the group consisting of an optical excitation detector, an absorption detector and a mass spectrometer.

4. The system of claim 1, in which the induction device comprises a first coil, a second coil and a third coil, in which longitudinal spacing between the first coil and the second coil is greater than longitudinal spacing between the second coil and the third coil, and in which the third coil is configured to be positioned closest to a terminus of the torch body, and in which the first coil is coupled to the second coil and the second coil is coupled to the third coil.

5. The system of claim 1, in which the induction device comprises a first coil, a second coil and a third coil, in which longitudinal spacing between the first coil and the second coil is less than longitudinal spacing between the second coil and the third coil, and in which the third coil is configured to be positioned closest to a terminus of the torch body, and in which the first coil is coupled to the second coil and the second coil is coupled to the third coil.

6. The system of claim 1, further comprising a radio frequency source electrically coupled to the induction device.

7. The system of claim 6, in which the radio frequency source is configured to provide radio frequencies of about 1 MHz to about 1000 MHz at a power of about 10 Watts to about 10,000 Watts.

8. The system of claim 1, comprising a first radio frequency source electrically coupled to at least one coil of the induction device and a second radio frequency source electrically coupled to a different coil of the induction device.

9. The system of claim 8, in which each of the first radio frequency source and the second radio frequency source is configured to provide radio frequencies of about 1 MHz to about 1,000 MHz at a power of about 10 Watts to about 10,000 Watts.

10. The system of claim 1, in which the induction device comprises a first coil, a second coil and a third coil, in which longitudinal spacing between the first coil and the second coil is greater than longitudinal spacing between the second coil and the third coil, and in which the third coil is configured to be positioned closest to a terminus of the torch body, in which the first coil is coupled to the second coil and the second coil is coupled to the third coil, and in which the spacing between each coil is selected to shift a maximum analyte signal to occur at a lower nebulization gas flow rate.

11. The system of claim 10, in which the spacing between the first coil and the second coil is about 4 mm and the spacing between the second coil and the third coil is about 2 mm.

12. The system of claim 1, in which the induction device comprises a first coil, a second coil and a third coil, in which longitudinal pacing between the first coil and the second coil is less than longitudinal spacing between the second coil and the third coil, and in which the third coil is configured to be positioned closest to a terminus of the torch body, and in which the first coil is coupled to the second coil and the second coil is coupled to the third coil, and in which the spacing between each coil is selected to shift a maximum analyte signal to occur at a lower nebulization gas flow rate.

13. The system of claim 12, in which the spacing between the first coil and the second coil is about 2 mm and the spacing between the second coil and the third coil is about 4 mm.

14. The system of claim 1, in which the induction device comprises at least four coils coupled to each other with at least two of the coils spaced differently in the longitudinal direction than a longitudinal spacing between two other coils.

15. The system of claim 1, in which the induction device comprises at least five coils coupled to each other with at least two of the coils spaced differently in the longitudinal direction than a longitudinal spacing between two other coils.

16. The system of claim 1, further comprising a radio frequency source electrically coupled to the induction device, the radio frequency source comprising variable capacitors configured to permit adjustment of a plasma voltage with different coil spacing.

17. The system of claim 1, further comprising a sampling interface fluidically coupled to the torch body.

18. The system of claim 17, in which the sampling interface comprises a sampling cone.

19. The system of claim 1, in which the induction device comprises a first coil, a second coil and a third coil, in which longitudinal spacing between the first coil and the second coil is less than longitudinal spacing between the second coil and the third coil, and in which the third coil is configured to be positioned closest to a terminus of the torch body, and in which the first coil is coupled to the second coil and the second coil is coupled to the third coil, and in which the spacing between each coil is selected to shift a maximum interfering oxide signal to occur at a higher nebulization gas flow rate.

20. The system of claim 1, in which the induction device comprises a first coil, a second coil and a third coil, in which longitudinal spacing between the first coil and the second coil is less than longitudinal spacing between the second coil and the third coil, and in which the third coil is configured to be positioned closest to a terminus of the torch body, and in which the first coil is coupled to the second coil and the second coil is coupled to the third coil, and in which the spacing between each coil is selected to shift a maximum interfering oxide signal to occur at a higher nebulization gas flow rate.

* * * * *